(12) United States Patent
Takenaka

(10) Patent No.: US 6,765,637 B2
(45) Date of Patent: Jul. 20, 2004

(54) TRANSLUCENT REFLECTION TYPE ELECTRO-OPTIC DEVICES AND METHODS FOR MANUFACTURING THE SAME

(75) Inventor: Satoshi Takenaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 10/314,304

(22) Filed: Dec. 9, 2002

(65) Prior Publication Data

US 2003/0142253 A1 Jul. 31, 2003

(30) Foreign Application Priority Data

Dec. 14, 2001 (JP) ........................................ 2001-381583

(51) Int. Cl.$^7$ ............................................ G02F 1/1335
(52) U.S. Cl. ...................................... 349/113; 349/114
(58) Field of Search ................................. 349/113, 114

(56) References Cited

U.S. PATENT DOCUMENTS 6,341,002 B1 * 1/2002 Shimizu et al. ............. 349/119
6,380,995 B1 * 4/2002 Kim ........................... 349/113

FOREIGN PATENT DOCUMENTS

JP      A 2000-162637      6/2000

* cited by examiner

Primary Examiner—Robert H. Kim
Assistant Examiner—Richard H Kim
(74) Attorney, Agent, or Firm—Oliff & Berridge, PLC

(57) ABSTRACT

The present invention provides a translucent reflection type electro-optic device that can increase a display light amount in both a reflection mode and a transmission mode, an electronic instrument therewith, and a method of fabricating the translucent reflection type electro-optic device. In a TFT array substrate of a reflection type electro-optic device, on a bottom layer side of a light reflection film, a concavity and convexity formation layer that forms a concavity and convexity pattern can be formed with a first photosensitive resin having a refractive index, $n_1$, on a top layer of the concavity and convexity formation layer a top layer insulating film made of a second photosensitive resin having a refractive index, $n_2$ ($n_1 > n_2$), is formed, and at a position that overlaps with convexities of the concavity and convexity pattern, a light transmission window is formed. Accordingly, an interface between the concavity and convexity formation layer and the top layer insulating film plays a function as a condenser lens that refracts a light incident from a back surface side toward the light transmission window.

15 Claims, 18 Drawing Sheets

TRANSLUCENT REFLECTION TYPE ELECTRO-OPTIC DEVICES AND METHODS FOR MANUFACTURING THE SAME

BACKGROUND OF THE INVENTION

1. Field of Invention

The present invention relates to a translucent reflection type electro-optic device, an electronic instrument therewith, and a method of fabricating a translucent reflection type electro-optic device. In particular, the present invention relates to a pixel configuration of a translucent reflection type electro-optic device.

2. Description of Related Art

Electro-optic devices, such as liquid crystal devices, are used as direct-viewing display devices of various instruments. Among the electro-optic devices, for instance, in an active matrix type liquid crystal device that uses a thin film transistor (TFT) as a pixel switching non-linear element, as shown in FIGS. 16 and 17, of a TFT array substrate 10 and an opposite substrate 20 that interpose a liquid crystal 50 as an electro-optic material, on the TFT array substrate 10, a pixel switching TFT 30 and a pixel electrode 9a that is made of a transparent conductive film such as an ITO film electrically connected to the TFT 30 can be formed.

Furthermore, of the liquid crystal devices in a reflective type, in order to reflect an ambient light incident from a side of the opposite substrate 20 toward the opposite substrate 20, a light reflection film 8a is formed on a bottom layer side of the transparent pixel electrode 9a. As shown with an arrow mark LA in FIGS. 17 and 18, the light that enters from the opposite substrate 20 side is reflected by the TFT array substrate 10 side, and a light that exits from the opposite substrate 20 side displays an image (reflection mode).

However, in the reflective type liquid crystal device, when directionality of the light reflected from the light reflection film 8a is strong, remarkable dependency on an angle of field, such as brightness, is different depending on an angle of viewing an image is caused. Accordingly, at the fabrication of a liquid crystal device, on a surface of an interlayer insulating film 4 or of a surface protection film (not shown) formed thereon, a photosensitive resin, such as acrylic resin, is coated in a thickness of 800 to 1500 nm. Thereafter, by use of photolithography of a bottom layer side of the light reflection film 8a in a region that overlaps with the light reflection film 8a in plane, a convexity and concavity formation layer 13a made of the photosensitive resin is selectively left with a predetermined pattern. Thereby, a surface of the light reflection film 8a is endowed with a concavity and convexity pattern 8g. In addition, since, in this state as it is, edges of the concavity and convexity formation layer 13a appear as it is in the concavity and convexity pattern 8g, another layer, a top layer insulating film 7a made of a photosensitive resin layer higher in fluidity, is coated and formed on a top layer of the concavity and convexity formation layer 13a, and thereby the surface of the light reflection film 8a is endowed with a concavity and convexity pattern 8g that is edgeless and formed in a smooth shape.

Furthermore, among the reflective liquid crystal devices in a translucent reflection type liquid crystal device that can display even in transmission mode, in the light reflection film 8a, in a region that overlaps with the pixel electrode 9a in plane, a light transmission window 8d is formed. So far, for instance, as shown in FIG. 16, one light transmission window 8d has been formed in rectangle for each pixel. In a region corresponding to the light transmission window 8d, the concavity and convexity formation layer 13a is either entirely formed or not at all formed, resulting in a flat surface.

In the translucent reflection type liquid crystal device thus configured, when a backlight device (not shown) is disposed on a side of the TFT array substrate 10 and a light exited from the backlight device is entered from the side of the TFT array substrate 10, as shown with arrow marks LB1 and LB2 in FIG. 18, a light proceeding to the light reflection film 8a is intercepted with the light reflection film 8a and does not contribute in the display. By contrast, the light proceeding to the light transmission window 8d where the light reflection film 8a is not formed, as shown with an arrow mark LB0 in FIGS. 17 and 18, transmits through the light transmission window 8d to the opposite substrate 20 side, resulting in contributing in the display (transmission mode).

SUMMARY OF THE INVENTION

However, in the existing translucent reflection type liquid crystal device, a display light amount in the reflection mode and that in the transmission mode are completely provided by areas of the light reflection film 8a and the light transmission window 8d. Accordingly, when the brightness of one display mode is heightened, that of the other display mode is sacrificed, resulting in a problem of difficulty in improving the brightness in both modes.

In view of the above problems, the present invention intends to provide a translucent reflection type electro-optic device that can increase a display light amount in both reflection mode and transmission mode, an electronic instrument therewith, and a method for fabricating a translucent reflection type electro-optic device.

In order to overcome the problems, the present invention can provide, a translucent reflection type electro-optic device including, on a substrate that holds an electro-optic material, a concavity and convexity formation layer made of a first light transmitting material formed in a predetermined pattern, a top layer insulating film made of a second light transmitting material formed on a top layer side of the concavity and convexity formation layer, a light reflection film formed on a top layer side of the top layer insulating film, and a light transmitting electrode formed on a top layer or a bottom layer of the light reflection film at a top layer side of the top layer insulating film. Further, a light transmission window can be partially formed in the light reflection film, and wherein the light transmission window is plurally formed at positions each of which overlaps with at least part of a plurality of convexities that forms the concavity and convexity formation layer, or with at least part of plurality of concavities. Additionally, each of the first light transmitting material and the second light transmitting material has a refractive index that endows an interface between the concavity and convexity formation layer and the top layer insulating film with a lens function that refracts a light entered from a back surface side of the substrate toward the light transmission window.

Furthermore, in the present invention, a method of fabricating a translucent reflection type electro-optic device that includes, on a substrate that holds an electro-optic material, a concavity and convexity formation layer made of a first light transmitting material formed in a predetermined pattern, a top layer insulating film made of a second light transmitting material formed on a top layer side of the concavity and convexity formation layer, a light reflection film formed on a top layer side of the top layer insulating film, and a light transmitting electrode formed on a top layer or a bottom layer of the light reflection film at a top layer side of the top layer insulating film. Further, a light transmission window is partially formed in the light reflection film. The method including plurally forming the light transmission window at positions each of which overlaps with at least part of a plurality of convexities that forms the concavity and convexity formation layer, or with at least part of a plurality of concavities. Further, the method can include using, as the first light transmitting material and the second light transmitting material, transparent materials having different refractive indices, and thereby endowing an interface between the concavity and convexity formation layer and the top layer insulating film with a lens function that refracts a light entered from a back surface side of the substrate toward the light transmission window.

In the translucent reflection type electro-optic device thereto the present invention is applied, since there is formed the light reflection film, a reflection mode display can be performed, and since the light transmission window is partially formed in the light reflection film, a transmission mode display can be also performed. Here, on a bottom layer side of the light reflection film, the concavity and convexity formation layer is formed with the first light transmitting material to endow the surface thereof with the concavity and convexity pattern, and on a top layer side of the concavity and convexity formation layer a top layer insulating film made of the second light transmitting material is formed. Accordingly, in the present invention, as the two light transmitting materials, ones having different refractive indices are used, and the light transmission window is formed at a position that overlaps with concavities or convexities that constitute the concavity and convexity formation layer, and thereby the lens function that refracts a light entered from a back surface side of the substrate toward the light transmission window is endowed to an interface between the concavity and convexity formation layer and the top layer insulating film. Accordingly, of the light entered from the back surface side of the substrate, a light that proceeds toward the light reflection film and does not so far contribute in the transmission mode display can contribute in the display by partially transmitting the light transmission window. Accordingly, without enlarging an area of the light transmission window, a display light amount in the transmission mode can be increased. As a result, without sacrificing the brightness in the reflection mode display, the brightness at the transmission mode can be improved.

In the present invention, the light transmission window, in some cases, is formed, for instance, at a position that overlaps with at least part of the convexities of the plurality of the convexities. In such a case, the convexity is formed into a convex lens shape that swells upward with roundness, and as the first light transmitting material a light transmitting material having a refractive index larger than that of the second light transmitting material is used.

In the present invention, when the plurality of the convexities is formed into a convex lens shape that swells upward with roundness, after the concavity and convexity formation layer is formed into a predetermined pattern with, for instance, a light transmitting photosensitive resin as the first light transmitting material, the photosensitive resin is heated and melted.

Furthermore, in the present invention, the light transmission window can be formed at a position that overlaps with at least part of the concavities of the plurality of the concavities. In this case, the concavity is formed into a concave lens shape that dents downward with roundness, and as the first light transmitting material a light transmitting material having a refractive index smaller than that of the second light transmitting material may be used.

In the present invention, when the plurality of the concavities is formed into a concave lens shape that dents downward with roundness, after the concavity and convexity formation layer is formed into a predetermined pattern with, for instance, a light transmitting photosensitive resin as the first light transmitting material, the photosensitive resin is heated and melted. In the present invention, as the first light transmitting material and the second light transmitting material, for instance, a light transmitting photosensitive resin can be used.

In the present invention, the light transmitting electrode is preferably formed on a top layer of the light reflection film. When thus configured, only by forming an opposite electrode of the opposite substrate and a transparent pixel electrode from the same light transmitting material, the electro-optic material can be hindered from polarizing and orientating. In the present invention, the electro-optic material is, for instance, liquid crystal.

Furthermore, a translucent reflection type electro-optic device according to the present invention can include, on a substrate that holds an electro-optic material, a concavity and convexity formation layer made of a first light transmitting material formed in a predetermined pattern, a top layer insulating film made of a second light transmitting material formed on a top layer side of the concavity and convexity formation layer, a light reflection film formed on a top layer side of the top layer insulating film, and a light transmitting electrode formed on a top layer or a bottom layer of the light reflection film at a top layer side of the top layer insulating film. Further, a light transmission window is partially formed in the light reflection film and the light transmission window is plurally formed at positions that overlap with at least part of a plurality of convexities that the concavity and convexity formation layer forms, or with at least part of a plurality of concavities. Each of the first light transmitting material and the second light transmitting material has a refractive index different from each other.

Accordingly, by arbitrarily selecting the refractive index among a light entered from a back surface side of a substrate, a light that proceeds toward the light reflection film and does not formerly contribute in the transmission mode display can be arbitrarily controlled in its refractive index. Accordingly, the light partially transmits the light transmission window and can contribute to the display. As a result, since without enlarging an area of the light transmission window, the display light amount in the transmission mode can be increased, without sacrificing the brightness in the reflection mode display the brightness in the transmission mode can be improved.

The electro-optic instrument that the present invention is applied can be used as a display device of an electronic instrument, such as mobile computers or portable telephones.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
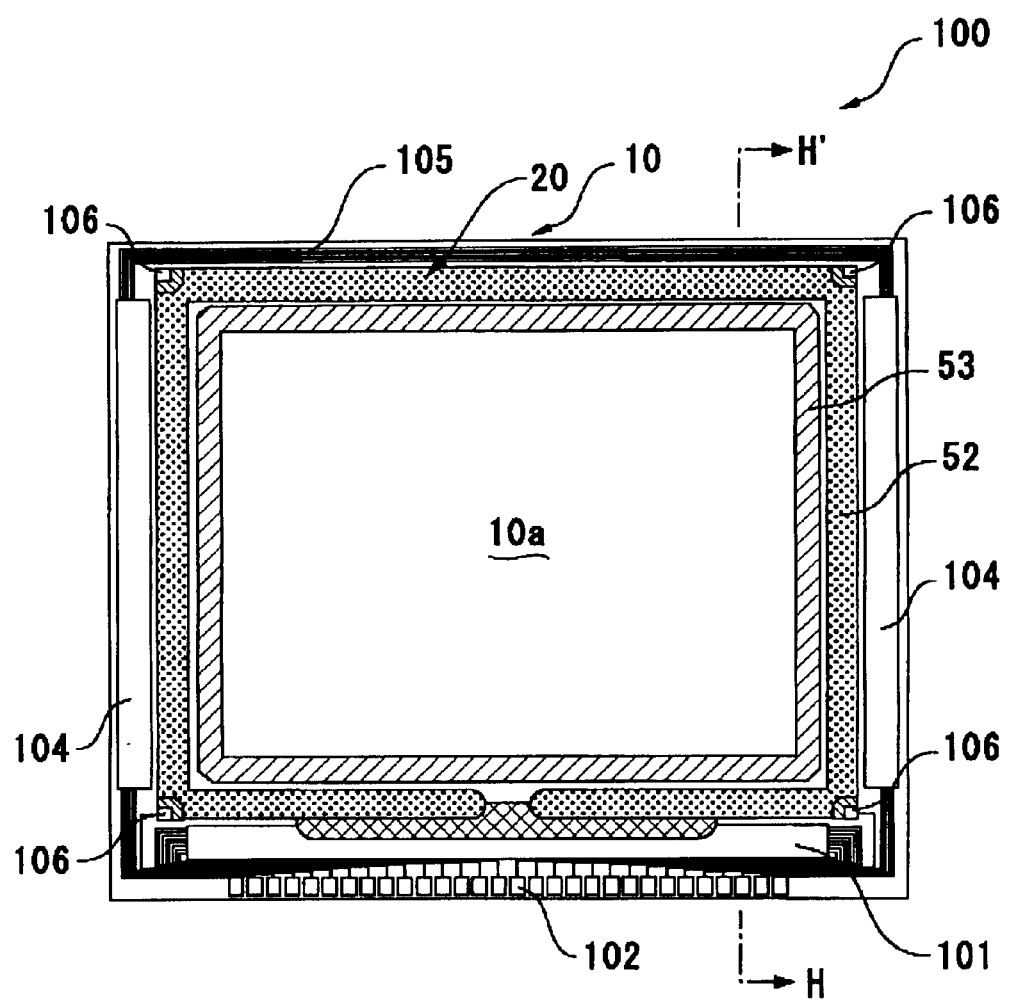
FIG. 1 is a plan view when an electro-optic device thereto the present invention is applied is seen from a side of an opposite substrate.
Figure 2:
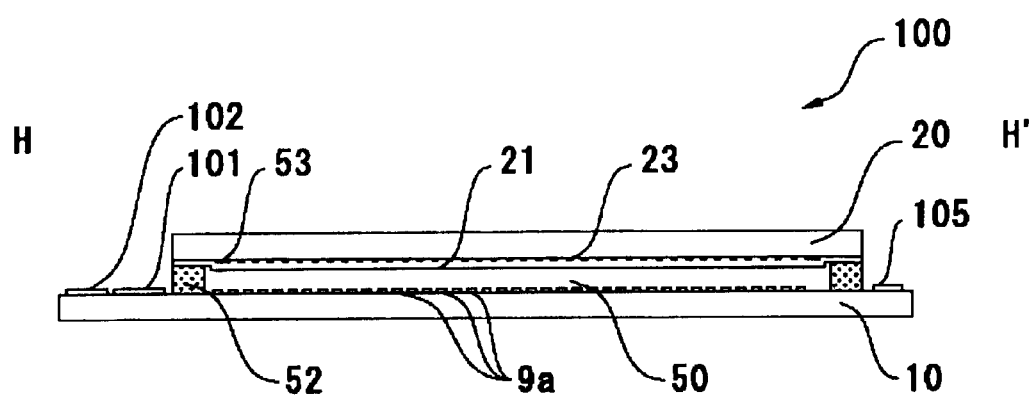
FIG. 2 is a sectional view in an H–H' line of FIG. 1.
Figure 3:
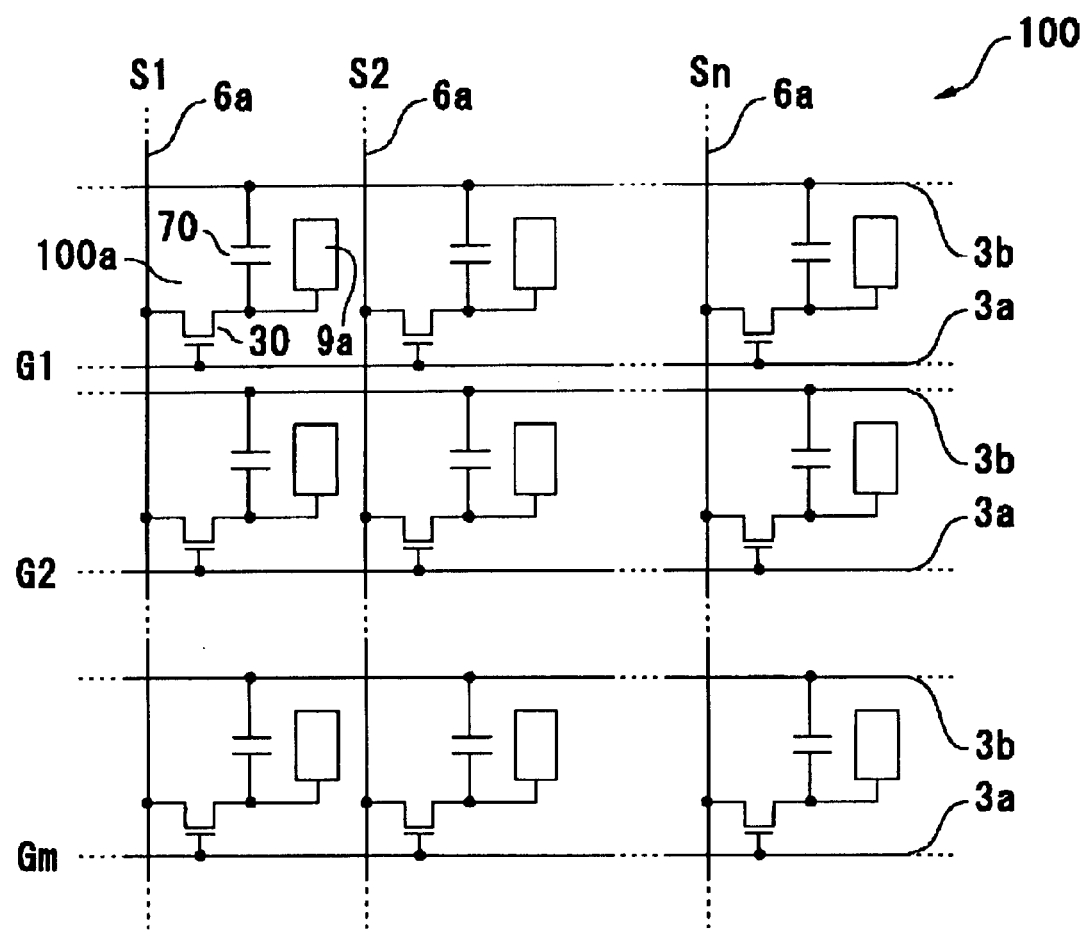
FIG. 3 is a diagram showing an equivalent circuit of elements formed in a plurality of pixels arranged in matrix in the electro-optic device.

FIG. 1 is a plan view in which an electro-optic instrument of the present invention is applied can be seen together with the respective constituents from a side of an opposite substrate, FIG. 2 being n H–H' sectional view of FIG. 1. FIG. 3 shows an equivalent circuit of various kinds of elements and wirings in a plurality of pixels formed in matrix in an image display region of the electro-optic instrument. In each of the drawings used to explain the present mode, in order to make the respective layers and members in an extent perceptible in magnitude in the drawings, scales are differentiated for the respective layers and members.

In FIGS. 1 and 2, in an electro-optic instrument 100 according to the present mode, a liquid crystal 50, as an electro-optic material, is interposed between a TFT array substrate 10 and a opposite substrate 20 that are adhered to each other by a sealant 52, and in an inward region of the formation region of the sealant 52 a peripheral partition 53 made of a light shielding material is formed. In a region outside of the sealant 52, a data line driving circuit 101 and an external connection terminal 102 are formed along one side of the TFT array substrate 10, and along two sides adjacent to the side scanning line driving circuits 104 are formed. Along one remaining side of the TFT array substrate 10, a plurality of wirings 105 are disposed to connect between the scanning line driving circuits 104 disposed along both sides of an image display region, and furthermore, in some cases, by utilizing a portion below the peripheral partition 53, a pre-charging circuit or an inspection circuit may be disposed. Furthermore, at least at one of the corner portions of the opposite substrate 20 an up and down continuation material 106 is formed so that electrical continuation may be established between the TFT array substrate 10 and the opposite substrate 20. Still furthermore, the data line driving circuit 101 and the scanning line driving circuit 104 may overlap with the sealant 52, or may be formed in the inside region of the sealant 52.

Instead of forming the data line driving circuit 101 and the scanning line driving circuit 104 on the TFT array substrate 10, for instance, a TAB (Tape Automated Bonding) substrate a driving LSI mounted thereon may be electrically and mechanically connected through an anisotropic conductive film to a terminal group formed in the surroundings of the TFT array substrate 10. In the electro-optic instrument 100, according to the kind of the liquid crystals 50 being used, that is, operation modes such as TN (twisted nematic mode) mode, STN (Super TN mode) mode, and normally white mode/normally black mode, a polarizing film, a retardation film, or a polarizing plate can be disposed in a predetermined direction, these are omitted in the drawings. In addition, when the electro-optic instrument 100 is configured for use in color display, in the opposite substrate 20, in regions corresponding to the respective pixel electrodes (described below) of the TFT array substrate 10, a color filter of RGB can be formed together with a protective film thereof.

In a screen display region of the electro-optic instrument 100 having such a configuration, as shown in FIG. 3, a plurality of pixels 100a is arranged in matrix, and in each of the pixels 100a pixel electrode 9a, and a pixel switching TFT 30 for driving the pixel electrode 9a are formed, and a data line 6a for supplying pixel signals S1, S2 . . . Sn is electrically connected to a source of the TFT 30. The pixel signals S1, S2 . . . Sn that are written in the data line 6a may be line sequentially supplied in the above order, or for a plurality of adjacent data lines 6a, may be supplied group by group. Furthermore, a scanning line 3a is electrically connected to a gate of the TFT 30, at predetermined timings, scanning signals G1, G2 . . . Gm may be line sequentially supplied to the scanning line 3a in the order in pulse. The pixel electrode 9a is electrically connected to a drain of the TFT 30, and when the TFT 30 that is a switching element is turned on for a definite duration, the pixel signals S1, S2, . . . Sn supplied from the data line 6a are written in the respective pixels at predetermined timings. The pixel signals S1, S2, . . . Sn that are written into a liquid crystal through the pixel electrode 9a and have a predetermined level are retained for a definite time period between an opposite electrode 21 of the opposite substrate 20 shown in FIG. 2.

The liquid crystal 50 varies in its orientation or order of molecular agglomeration depending on an applied voltage level, and thereby modulating a light and allowing displaying gradation. In a normally white mode, according to an applied voltage, a light amount of an incident light that transmits the liquid crystal 50 portion decreases, and in a normally black mode, according to an applied voltage, a light amount of an incident light that transmits the liquid crystal 50 portion increases. As a result, as a whole, the electro-optic instrument 100 emits a light having a contrast corresponding to the pixel signals S1, S2 . . . Sn.

In order to hinder the retained pixel signals S1, S2, . . . Sn from leaking, in some cases, in parallel with a liquid crystal capacitance formed between the pixel electrode 9a and the opposite electrode a storage capacitance 60 can be added. For instance, a voltage of the pixel electrode 9a is retained by the storage capacitance 60 for a time, such as three digits longer than that during which a source voltage is applied. Thereby, the electric charge retention characteristics are improved, resulting in realizing an electro-optic instrument 100 high in the contrast ratio. As a method for forming the storage capacitance 60, as illustrated in FIG. 3, the storage capacitance 60 may be formed with a capacitor line 3b that is wiring for forming the storage capacitance 60 or may be formed with a scanning line 3a in a preceding stage.

Figure 4:
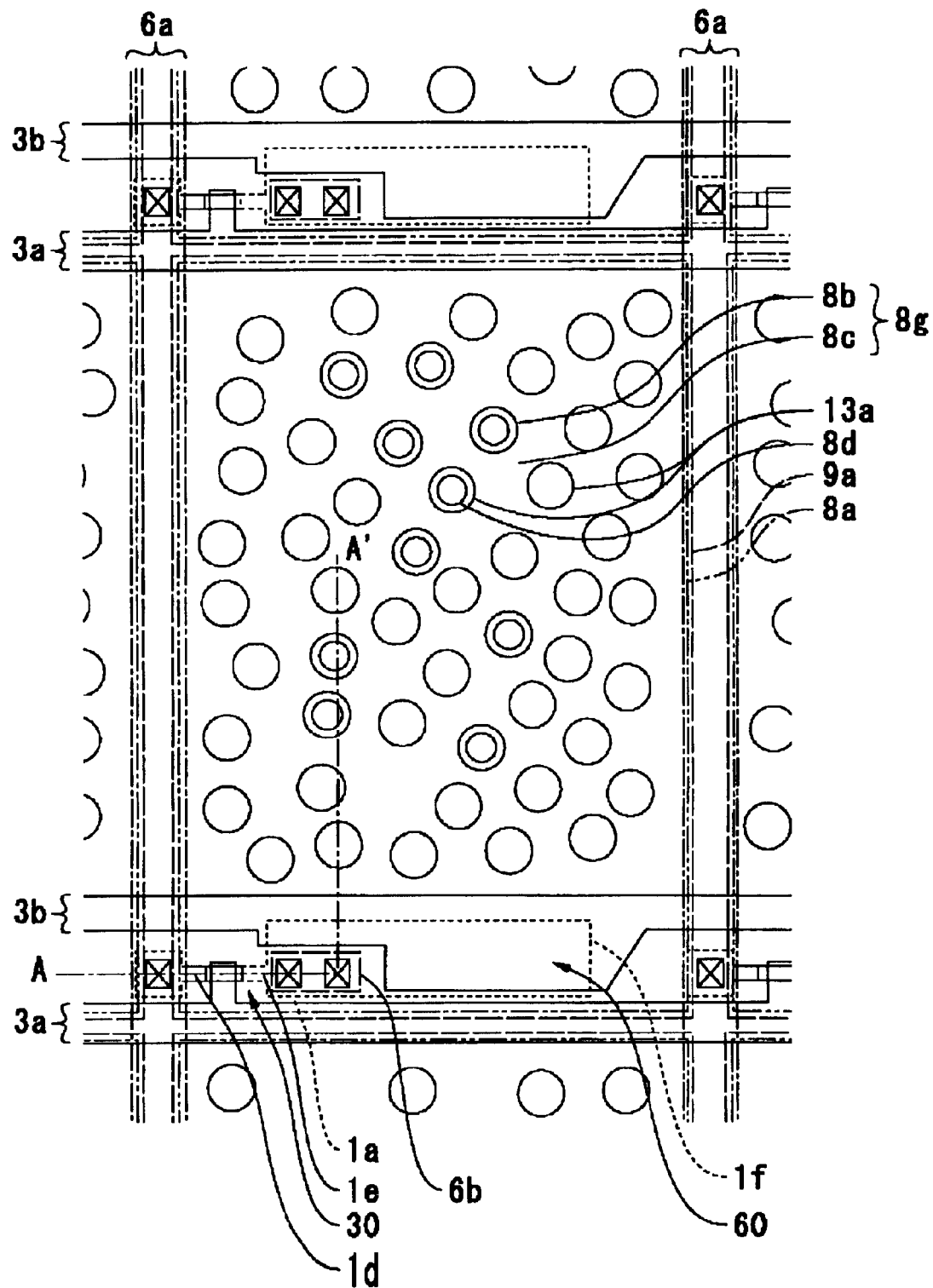
FIG. 4 is plan view showing a configuration of an individual pixel of a TFT array substrate of the electro-optic device according to the present invention.
Figure 5:
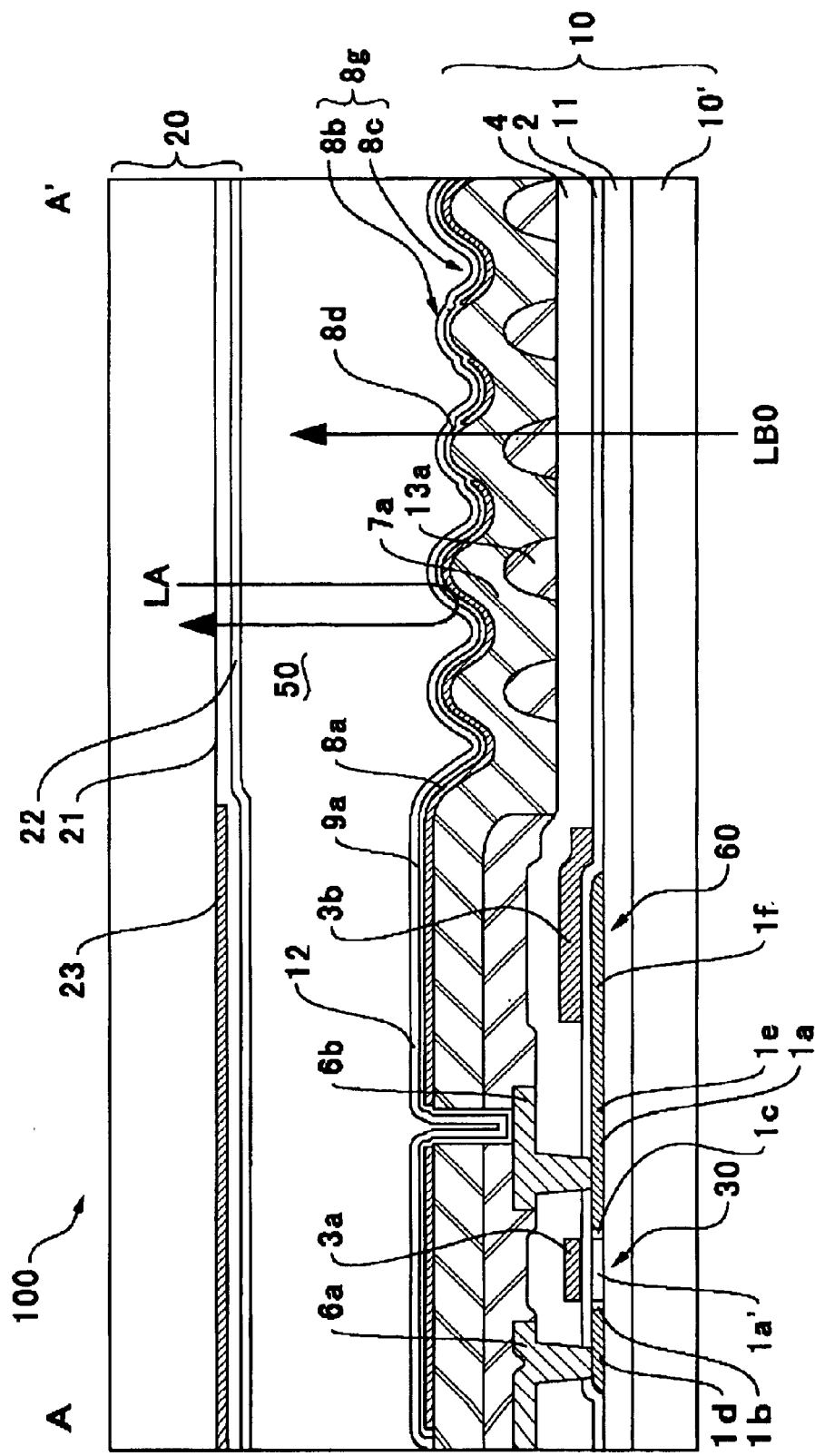
FIG. 5 is a sectional view when the electro-optic device according to the present invention is cut at a position corresponding to an A–A' line of FIG. 4.

FIG. 4 is a plan view of a plurality of adjacent pixels of a TFT array substrate that is applied to an electro-optic device according to the present mode. FIG. 5 is a sectional view when part of a pixel of the electro-optic device is cut at a position corresponding to an A–A' line of FIG. 4.

In FIG. 4, on a TFT array substrate 10, pixel electrodes 9a made of a plurality of transparent ITO (Indium Tin Oxide) films are formed in a matrix, with each of the pixel electrodes 9a being connected to a pixel switching TFT 30. Furthermore, along matrix-like boundaries of the pixel electrode 9a, a data line 6a, a scanning line 3a, and a capacitor line 3b are formed, the TFT 30 being connected to the data line 6a and the scanning line 3a. That is, the data line 6a is electrically connected through a contact hole to a high concentration source region 1d of the TFT 30, and a projected portion of the scanning line 3a forms a gate electrode of the TFT 30. The storage capacitance 60 has a structure in which one that is obtained by making an extension 1f of a semiconductor film 1 for forming the pixel switching TFT 30 conductive is regarded a lower electrode, and the capacitance line 3b is superposed as an upper electrode on the lower electrode 41.

In a cross section taken along an A–A' line in a pixel region thus configured, as shown in FIG. 5, on a surface of a transparent substrate 10' that is a base of the TFT array substrate 10, a substrate protection film 11 made of a silicon oxide film (insulating film) having a thickness in the range of 300 to 500 nm is formed, and on a surface of the substrate protection film 11 an island-like semiconductor film 1a having a thickness in the range of 30 to 100 nm is formed. On a surface of the semiconductor film 1a gate insulating film 2 made of a silicon oxide film having a thickness of substantially 50 to 150 nm is formed, and on surface of the gate insulating film 2, a scanning line 3a having a thickness of 300 to 800 nm is formed. Of the semiconductor film 1a, a region that opposes through the gate insulating film 2 to the scanning line 3a is a channel region 1a'. On one side with respect to the channel region 1a', a source region provided with a low concentration source region 1b and a high concentration source region 1d is formed, and on the other side thereof a drain region provided with a low concentration drain region 1c and a high concentration drain region 1e is formed.

On a front surface side of the pixel switching TFT 30, an interlayer insulating film 4 made of a silicon oxide film having a thickness of 300 to 800 nm is formed, and on a surface of the interlayer insulating film 4, in some cases, a surface protection film (not shown) made of a silicon nitride film having a thickness of 100 to 300 nm is formed. On the surface of the interlayer insulating film 4, a data line 6a having a thickness of 300 to 800 nm is formed, and the data line 6a is electrically connected through a contact hole formed in the interlayer insulating film 4 to the high concentration source region 1d. On the surface of the interlayer insulating film 4, a drain electrode 6b that is formed simultaneously with the data line 6a is formed, and the drain electrode 6b is electrically connected through a contact hole formed in the interlayer insulating film 4 to the high concentration drain region 1e.

On a top layer of the interlayer insulating film 4, a concavity and convexity formation layer 13a made of a first photosensitive resin is formed into a predetermined pattern, on a surface of the concavity and convexity formation layer 13a a top layer insulating film 7a made of a second photosensitive resin is formed, and on a surface of the top layer insulating film 7a a light reflection film 8a made of an aluminum film is formed. Accordingly, on a surface of the light reflection film 8a, concavities and convexities of the concavity and convexity formation layer 13a are reflected through the top layer insulating film 7a, and thereby a concavity and convexity pattern 8g is formed.

On a top layer of the light reflection film 8a, a pixel electrode 9a made of an ITO film is formed. The pixel electrode 9a is directly laminated on a surface of the light reflection film 8a, and the pixel electrode 9a and the light reflection film 8a are electrically connected. Furthermore, the pixel electrode 9a is electrically connected through a contact hole formed in the photosensitive resin layer 7a and the interlayer insulating film 4 to the drain electrode 6b.

On a top surface side of the pixel electrode 9a, an orientation film 12 made of a polyimide film is formed. The orientation film 12 is a polyimide film to which the rubbing is applied.

With respect to the extension 1f (bottom electrode) from the high concentration drain region 1e, a capacitance line 3b, as a top electrode, faces through an insulating film (dielectrics film) formed simultaneously with the gate insulating film 2, and thereby a storage capacitance 60 is formed.

Although the TFT 30 has an LDD structure as mentioned above, it may have an offset structure in which impurity ion-implantation is not implemented to regions corresponding to the low concentration source region 1b and the low concentration drain region 1c. Furthermore, the TFT 30 may be a self-alignment type TFT in which an impurity ion is implanted at a high concentration level with the gate electrode (part of the scanning line 3a) as a mask, thereby a source and drain region of high concentration being formed in a self-alignment manner.

Furthermore, although in the present mode a single gate structure in which only one gate electrode (scanning line 3a) of the TFT 30 is disposed between the source and drain regions is adopted, it should be understood that two or more gate electrodes may be disposed therebetween. At this time, to the respective gate electrodes, the same signal is applied. When the TFT 30 is configured with a dual gate (double gate) or triple gate or more like this, a leakage current at a connecting portion between the channel and the source-drain region can be inhibited, and thereby resulting in reducing an electric current at the off time. When at least one of the gate electrodes is formed into the LDD structure or the offset structure, off current can be further reduced, resulting in realizing a stable switching element.

Figure 6:
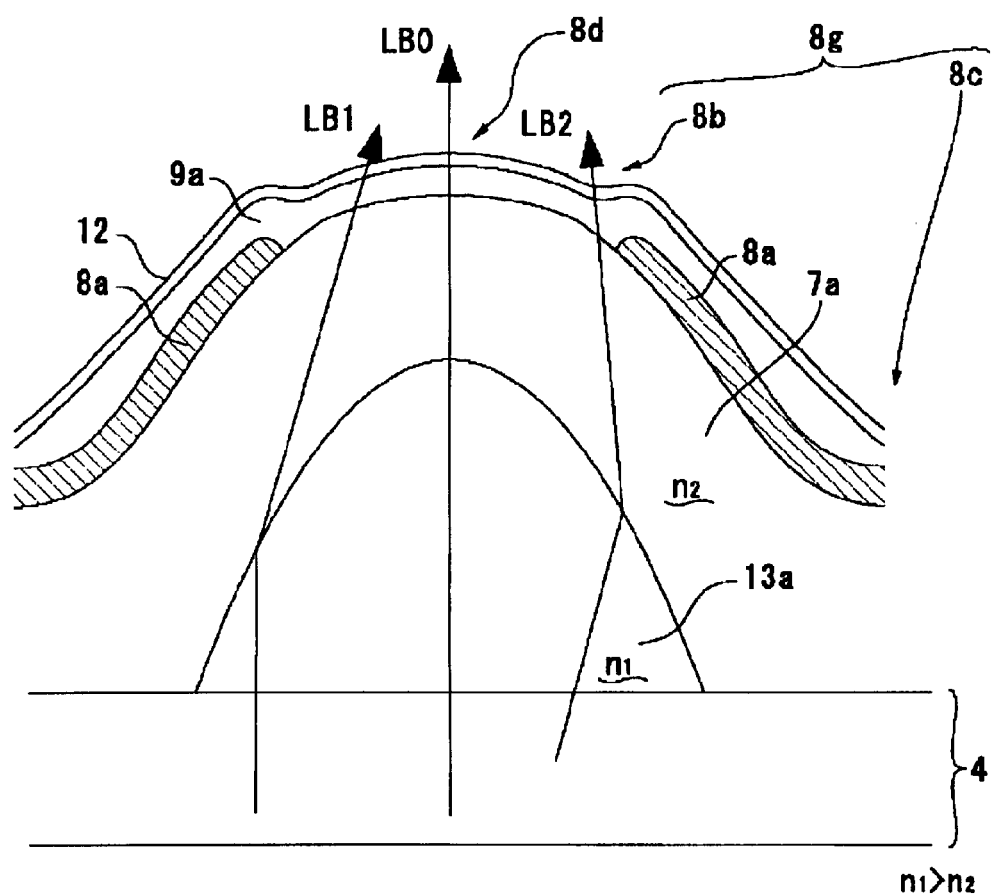
FIG. 6 is an explanatory drawing of a concavity and convexity pattern and a light transmission window of the TFT array substrate, in the electro-optic device according to the present invention.
Figure 7:
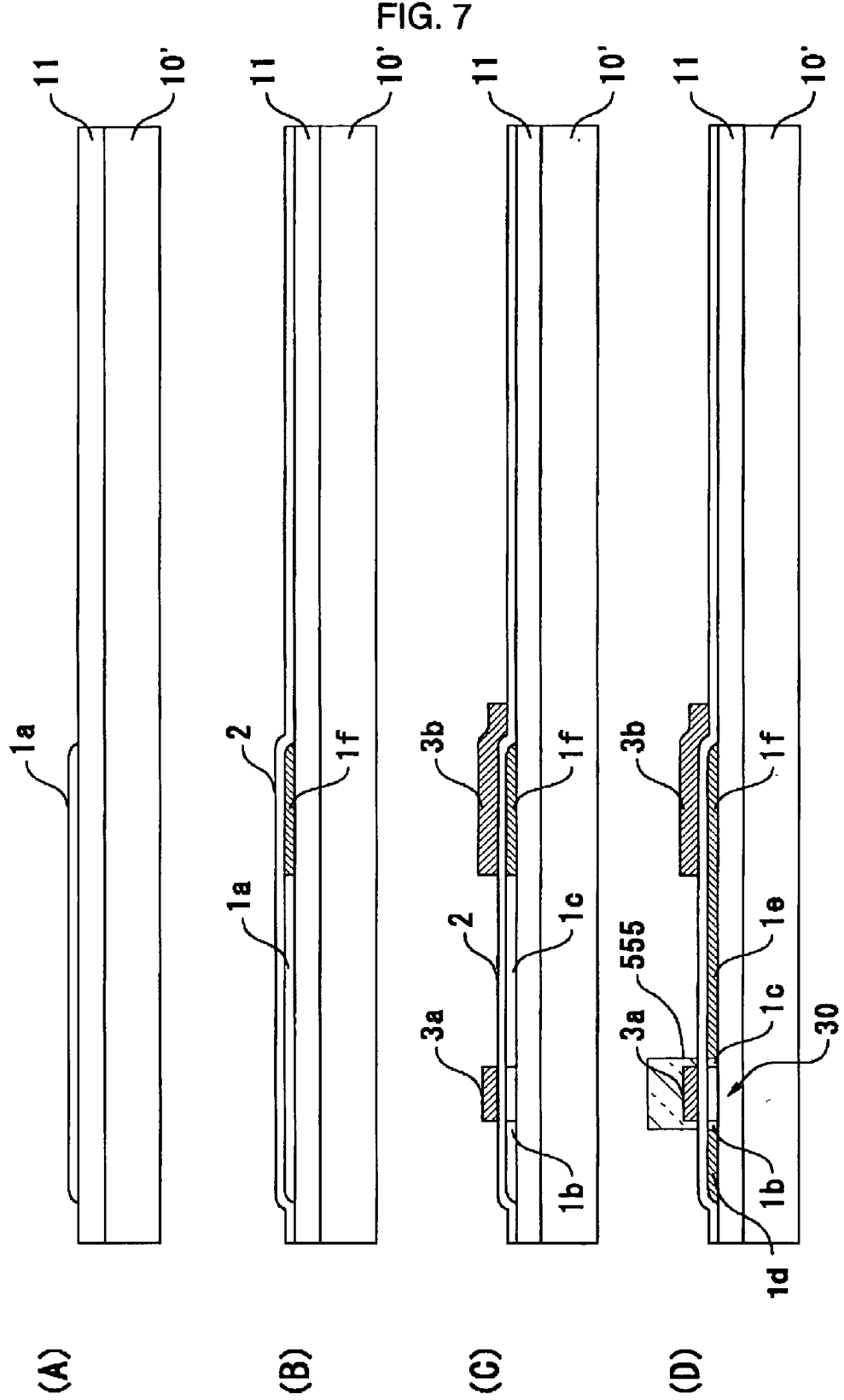
FIGS. 7A through 7D are process sectional views showing a fabricating method of the TFT array substrate according to the present invention.
Figure 8:
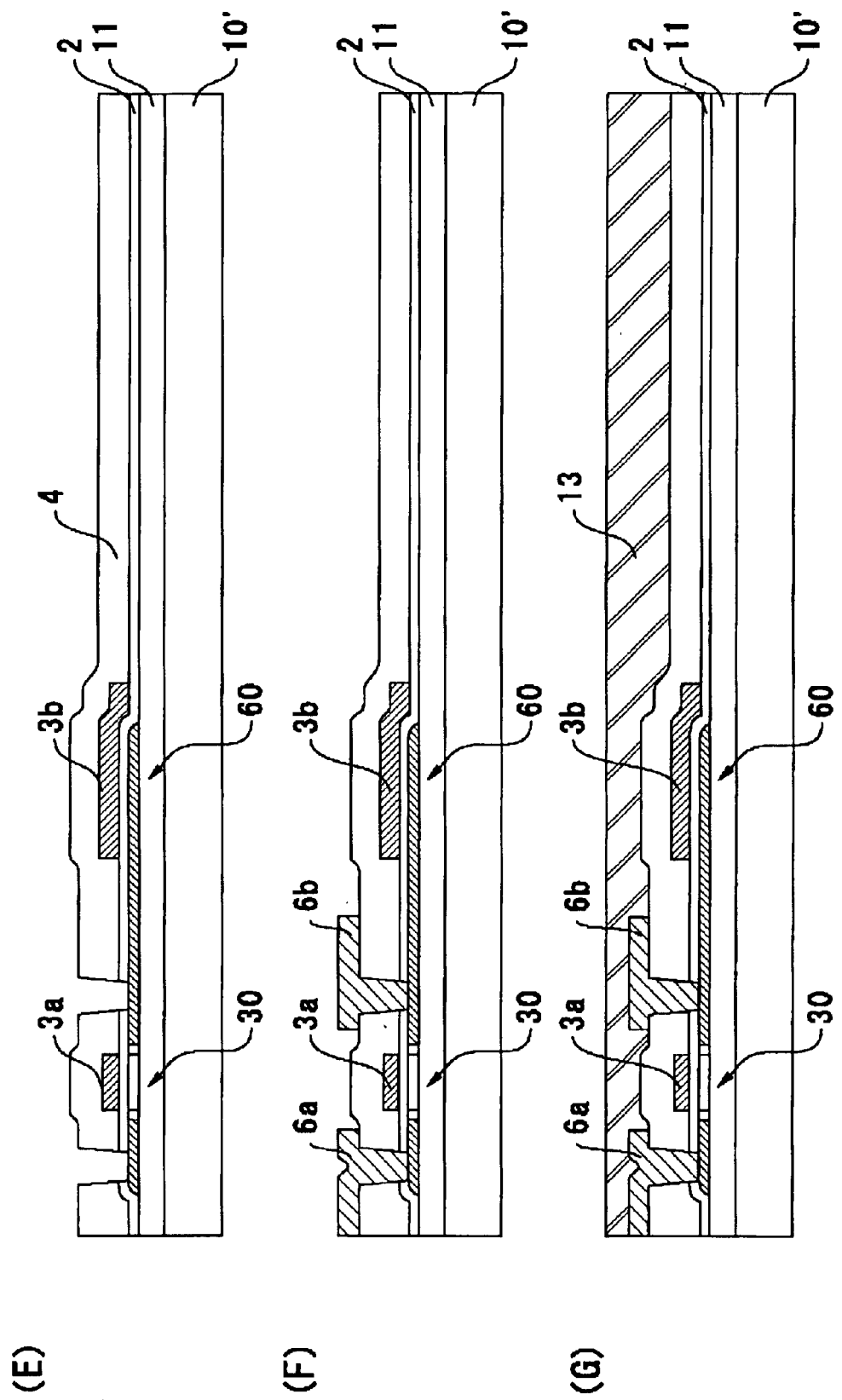
FIGS. 8E through 8G are process sectional views showing a fabricating method of the TFT array substrate according to the present invention.
Figure 9:
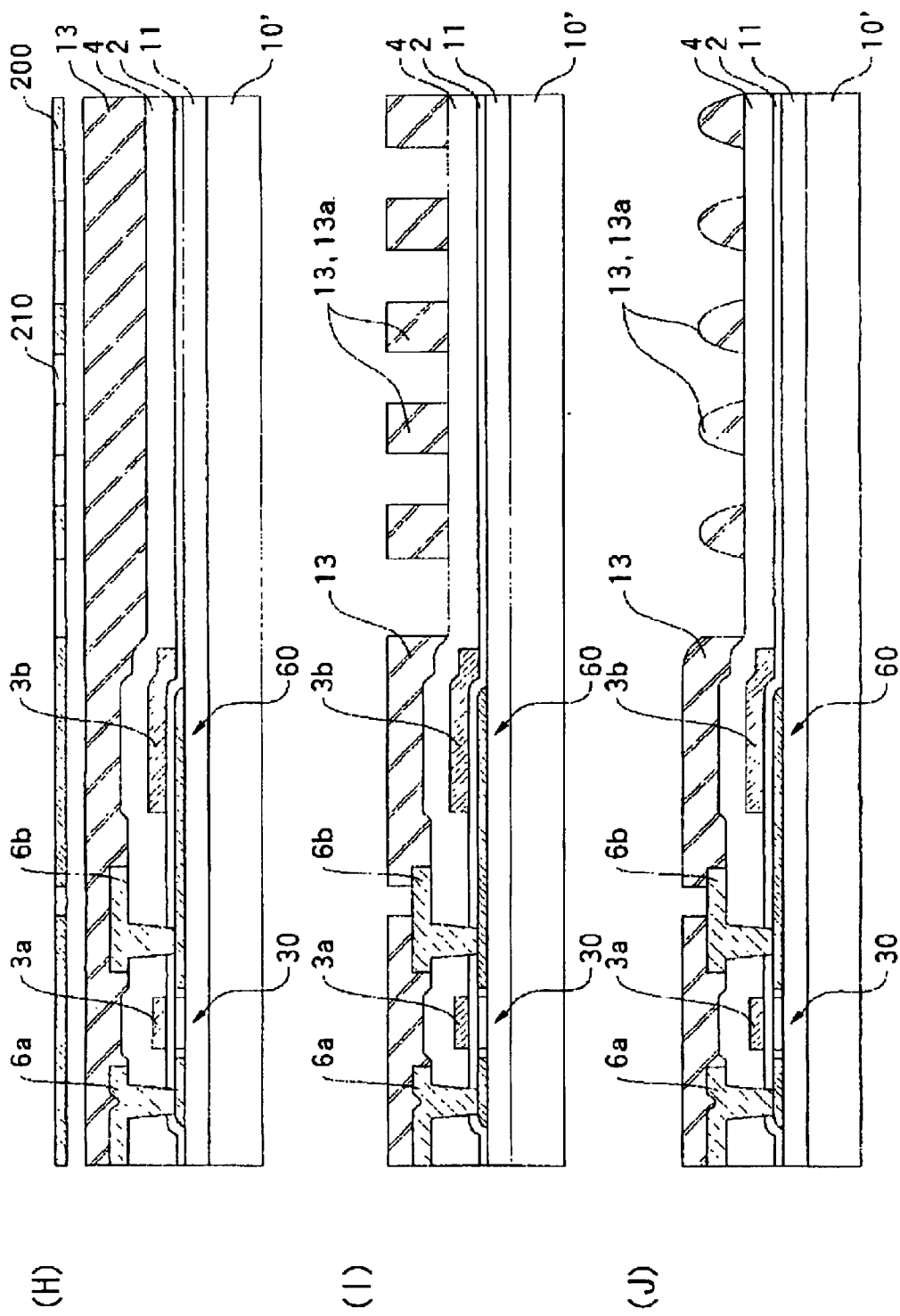
FIGS. 9H through 9J are process sectional views showing a fabricating method of the TFT array substrate according to the present invention.
Figure 10:
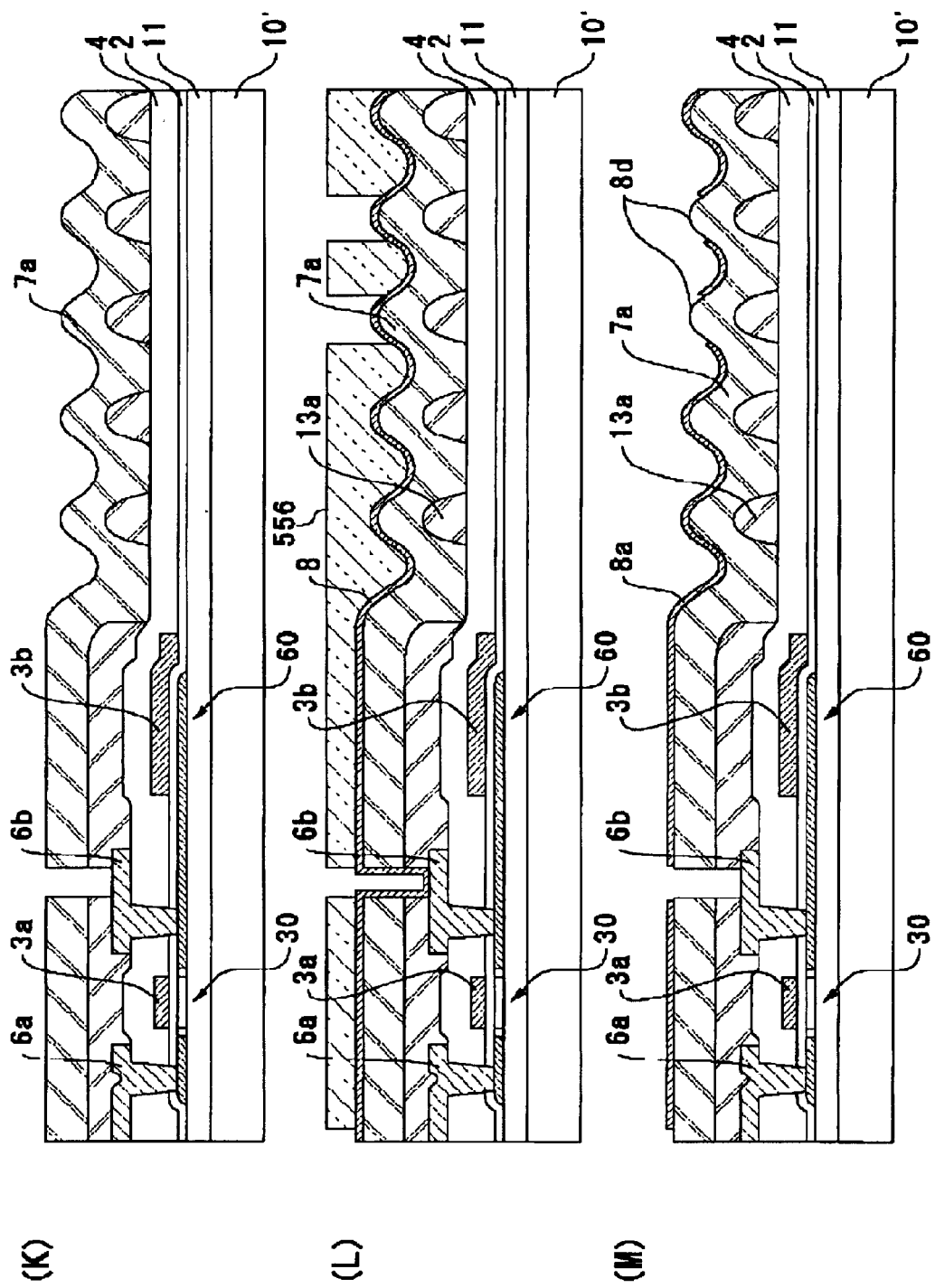
FIGS. 10K through 10M are process sectional views showing a fabricating method of the TFT array substrate according to the present invention.
Figure 11:
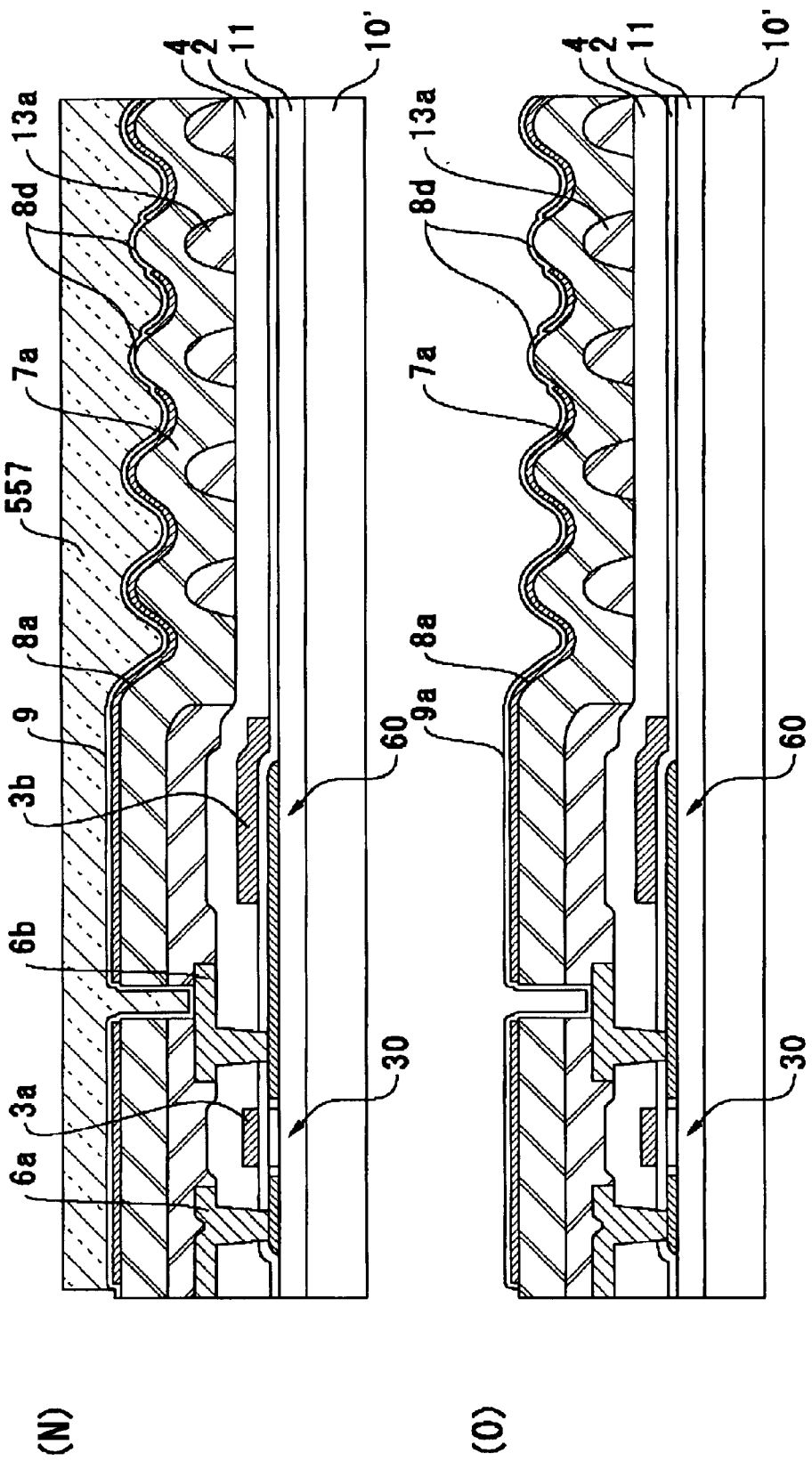
FIGS. 11N and 11O are process sectional views showing a fabricating method of the TFT array substrate according to the present invention.

FIG. 6 is an explanatory drawing that shows in enlargement the concavity and convexity pattern and the surroundings of a light transmission window formed on the TFT array substrate in the electro-optic device shown in FIG. 5.

In the TFT array substrate 10 thus configured, on a surface of the light reflection film 8a, concavity and convexity pattern 8g provided with a convexity 8b and a concavity 8c is formed. In the present mode, as shown in FIG. 4, the convexity 8b, and the concavity and convexity formation layer 13a that constitutes the convexity are expressed as having circular plane shape. However, the plane shape of the convexity 8b and the concavity and convexity formation layer 13a is not restricted to the circle, and various shapes such as ellipses, or polygons such as hexagons or squares can be adopted.

When configuring the concavity and convexity pattern 8g like this, in the TFT array substrate 10 according to the mode, as shown in FIG. 5, of a bottom layer side of the light reflection film 8a, in a region corresponding to the convexity 8b of the concavity and convexity pattern 8g, the concavity and convexity formation layer 13a made of the first light transmitting photosensitive resin (the first light transmitting material) is selectively left in a predetermined pattern, and a surface of the light reflection film 8a formed on a top layer side thereof is endowed with the concavity and convexity pattern 8g. In the present mode, the concavity and convexity formation layer 13a has a convex lens shape that swells upward with roundness.

Furthermore, in the mode, when another layer, a top layer insulating film 7a made of a second light transmitting photosensitive resin (the second light transmitting material) high in fluidity is coated and formed on the top layer of the concavity and convexity formation layer 13a, and thereby a surface of the light reflection film 8a is endowed with a smoothly shaped concavity and convexity pattern 8g.

Here, the refractive index, $n_1$, of the first photosensitive resin that constitutes the concavity and convexity formation layer 13a, and the refractive index, $n_2$, of the second photosensitive resin that constitutes the top layer insulating film 7a are regarded different in their values. Accordingly, a light entered from the outside does not proceed straight at an interface between the concavity and convexity formation layer 13a and the top layer insulating film 7a and is deflected there in any directions.

First, an embodiment where the refractive index, $n_1$, of the first photosensitive resin that constitutes the concavity and convexity formation layer 13a is larger than that, $n_2$, of the second photosensitive resin that constitutes the top layer insulating film 7a will be explained. In the present mode, the concavity and convexity formation layer 13a has a convex lens shape that swells upward with roundness. Accordingly, an interface between the concavity and convexity formation layer 13a and the top layer insulating film 7a functions as a condenser lens.

Furthermore, in the embodiment, in the light reflection film 8a in a region that overlaps in plane with the pixel electrode 9a, among many convexities 8b (regions where the concavity and convexity formation layer 13a is formed thicker) of the concavity and convexity pattern 8g, in a region that overlaps with center portions of part of the convexities 8b, circular light transmission windows 8d constituted of an opening a little smaller than the concavity and convexity formation layer 13a are formed. Accordingly, in a portion that corresponds to the light transmission window 8d, a pixel electrode 9a made of the ITO is present, but the light reflection film 8a is not present.

In FIG. 5, in the opposite substrate 20, in a region that faces matrix-like boundary regions of the pixel electrode 9a that is formed on the TFT array substrate 10, a light shielding film 23, called black matrix or black stripe, is formed. On a top layer side thereof an opposite electrode 21 made of an ITO film is formed. Furthermore, on a top layer side of the opposite electrode 21, an orientation film 22 made of a polyimide film is formed, and the orientation film 22 is one in which the rubbing is given to the polyimide film.

In the configured translucent reflection type electro-optic device 100, since on a bottom layer side of the pixel electrode 9a the light reflection film 8a is formed, as shown with an arrow mark LA in FIG. 5, a light incident from the opposite substrate 20 side is reflected at the TFT array substrate 10 side, resulting in displaying an image with a light exited from the opposite substrate 20 side (reflection mode).

Furthermore, of a light emitted from a backlight device (not shown in the drawing) disposed on a back surface side of the TFT array substrate 10, a light that proceeds toward the light transmission window 8d thereon the light reflection film 8a is not formed, as shown with an arrow mark LB0, transmits through the light transmission window 8d to the opposite substrate 20 side and contributes in displaying an image (transmission mode).

Still furthermore, in the embodiment, on a bottom layer side of the light reflection film 8a, the concavity and convexity formation layer 13a that endows the surface thereof with the concavity and convexity pattern 8g is formed with the first photosensitive resin having the refractive index, $n_1$, and on a top layer of the concavity and convexity formation layer 13a the top layer insulating film 7a made of the second photosensitive resin having the refractive index, $n_2$ ($n_1 > n_2$), is formed, and at positions that overlap with the convexities 8b of the concavity and convexity pattern 8g, the light transmission windows 8d are formed. Accordingly, an interface between the concavity and convexity formation layer 13a and the top layer insulating film 7a is provided with a lens function that refracts a light incident from a back surface side of the TFT array substrate 10 toward the light transmission window 8d.

Accordingly, of the light entered from the back surface side of the TFT array substrate 10, a light that proceeds to the light reflection film 8a and does not formerly contribute in the display in the transmission mode, as shown with arrow marks LB1 and LB2 in FIG. 6, also transmits through the light transmission window 8d and contributes in the display.

Accordingly, without enlarging an area of the light transmission window 8d, a display light amount in the transmission mode can be increased, as a result, without sacrificing display brightness in the reflection mode, display brightness in the transmission mode can be improved.

Of fabricating processes of the electro-optic device 100 having such a configuration, processes for fabricating the TFT array substrate 10 will be explained with reference to FIGS. 7 through 11. FIGS. 7 through 11 each are process sectional views showing a fabricating method of the TFT array substrate 10 according to the embodiment, and the drawings each correspond to cross sections in n A–A' line of FIG. 4.

First, as shown in FIG. 7A, substrate 10' made of glass or the like and cleansed by use of ultrasonic cleaning is prepared. Thereafter under a temperature condition where a substrate temperature is in the range of 150 to 450 degrees centigrade, by use of a plasma CVD method, a substrate protection film 11 made of a silicon oxide film having a thickness of 300 to 500 nm is formed over an entire surface of the substrate 10'. As a raw material gas at this time, for instance, a gas mixture of monosilane and a laughter gas, TEOS and oxygen, or disilane and ammonia can be used.

Next, on a surface of the substrate protection film 11, an island-like semiconductor film 1a (active layer) is formed. For this, under the temperature condition where a substrate temperature is in the range of 150 to 450 degrees centigrade, on an entire surface of the substrate 10', a semiconductor film made of an amorphous silicon film is formed by use of the plasma CVD method in a thickness of 30 to 100 nm. Thereafter, a laser light is irradiated on the semiconductor film to apply the laser annealing thereto, thereby the amorphous semiconductor film is once melted followed by cooling and solidifying, resulting in crystallizing. At this time, since a laser irradiating time period to each of the regions is extremely short and an irradiating region is also localized relative to an entire substrate, the entire substrate is not heated simultaneously to a high temperature. Accordingly, even when the glass substrate is used as the substrate 10', there is caused no deformation or cracking due to heat. Then, on a surface of the semiconductor film, a resist mask is formed by use of the photolithography, and when the semiconductor film is etched through the resist mask, the island-like semiconductor film 1a is formed. As a raw material gas when the semiconductor film 1a is formed, for instance disilane or monosilane can be used. The crystallization may be performed by use of a solid phase growth method, or an RTA (Rapid Thermal Anneal) method with a flash lamp or a tungsten lamp. Furthermore, the amorphous semiconductor film, after deposition, is patterned island-like, and according to the above method, the island-like amorphous semiconductor film may be crystallized.

Next, as shown in FIG. 7B, under a temperature condition of 350 degrees centrigrade or less, over an entire surface of the substrate 10' a gate insulating film 2 made of a silicon oxide film having a thickness of 50 to 150 nm is formed. As a raw material gas at this time, a gas mixture of, for instance, TEOS and oxygen can be used. The gate insulating film 2 formed here may be, in place of the silicon oxide film, a silicon nitride film.

Next, though not shown in the drawing, through a predetermined resist mask an impurity ion is implanted into an extension portion 1f of the semiconductor film 1a, and thereby a substrate electrode for constituting a storage capacitance 60 with a capacitance line 3b is formed.

Subsequently, as shown in FIG. 7C, a scanning line 3a (gate electrode) and the capacitance line 3b are formed. For this, by means of the sputtering method or the like, a conductive film made of an aluminum film, a tantalum film, a molybdenum film, or an alloy film mainly made of any one of the metals is formed over an entire surface of the substrate 10' in a thickness of 300 to 800 nm. Thereafter, by use of the photolithography, a resist mask is formed, and through the resist mask the conductive film is dry-etched.

Then, on sides of a pixel TFT portion and an N channel TFT portion (not shown in the drawing) of a driving circuit, with the scanning line 3a (gate electrode) as a mask, a low concentration impurity ion (phosphorus ion) is implanted at a dose amount of substantially $0.1 \times 10^{13}/cm^2$ to substantially $10 \times 10^{13}/cm^2$, and thereby a low concentration source region 1b and a low concentration drain region 1c are formed in a self-alignment manner with respect to the scanning line 3a. Here, since into a portion located immediately below the scanning line 3a, the impurity ion is not introduced, this portion becomes the channel region 1a' as the semiconductor film 1a is.

Next, as shown in FIG. 7D, a resist mask 555 wider than the scanning line 3a (gate electrode) is formed, a high concentration impurity ion (phosphorus ion) is implanted at a dose amount of substantially $0.1 \times 10^{15}/cm^2$ to substantially $10 \times 10^{15}/cm^2$, and thereby a high concentration source region 1d and a high concentration drain region 1e are formed.

In place of these impurity introduction processes, without performing the low concentration ion implanting, in a state where a resist mask wider than the gate electrode is formed, a high concentration impurity (phosphorus ion) is implanted, and thereby a source region and a drain region in an offset structure may be formed. Furthermore, by implanting a high concentration impurity with the scanning line 3a as a mask, the source region and the drain region of the self-alignment structure may be formed.

Though omitted from showing in the drawing, according to the processes like this, an N channel TFT portion of a peripheral driving circuit is formed. In addition, when a P channel TFT portion of the peripheral driving circuit is formed, with a pixel portion and the N channel TFT portion covered and protected with a resist, and with the gate electrode as a mask, a boron ion is implanted at a dose amount of substantially $0.1 \times 10^{15}/cm^2$ to substantially $10 \times 10^{15}/cm^2$, and thereby a source/drain region of the P channel is formed in a self-alignment manner. At this time, similarly to the formation of the N channel TFT portion, with the gate electrode as a mask, a low concentration impurity (boron ion) is introduced at a dose amount of substantially $0.1 \times 10^{13}/cm^2$ to substantially $10 \times 10^{13}/cm^2$, thereby a low concentration region is formed in a polysilicon film, thereafter a mask wider than the gate electrode is formed, a high concentration impurity (boron ion) is implanted at a dose amount of substantially $0.1 \times 10^{15}/cm^2$ to substantially $10 \times 10^{15}/cm^2$, and thereby a source region and a drain region having a LDD structure (Lightly Doped Drain structure) may be formed. Still furthermore, without performing the low concentration impurity implantation, in a state where a mask wider than the gate electrode is formed, a high concentration impurity (phosphorus ion) is implanted, and thereby a source region and a drain region having a offset structure may be formed. According to the ion implantations, a CMOS can be formed and the peripheral driving circuits can be incorporated in the same substrate.

Subsequently, as shown in FIG. 8E, on a front surface side of the scanning line 3a, by means of the CVD method or the like, an interlayer insulating film 4 made of silicon oxide having a thickness of 300 to 800 nm is formed, thereafter a resist mask is formed by use of the photolithography, through the resist mask the interlayer insulating film 4 is etched, and thereby a contact hole is formed. As a raw material gas when the interlayer insulating film 4 is formed, for instance, a mixture gas of TEOS and oxygen gas can be used.

Next, as shown in FIG. 8F, on a front surface side of the interlayer insulating film 4 a data line 6a and a drain electrode 6b are formed. For this, by means of the sputtering method or the like, a conductive film made of an aluminum film, a tantalum film, a molybdenum film, or an alloy film mainly made of any one of the metals is formed in a thickness of 300 to 800 nm. Thereafter, by use of the photolithography, a resist mask is formed, and through the resist mask the conductive film is dry-etched.

Subsequently, as shown in FIG. 8G, on a front surface side of the data line 6a and the drain electrode 6b, alternatively after a surface protection film is formed thereon, by use of a spin-coat method or the like, a positive-type first photosensitive resin 13 is coated.

In the next place, as shown in FIG. 9H, through an exposure mask 200, the first photosensitive resin 13 is exposed. Here, in the exposure mask 200, a region corresponding to the concavity 8c of the concavity and convexity pattern 8g explained with reference to FIG. 5 is a light transmitting portion 210.

Subsequently, as shown in FIG. 9I, the first photosensitive resin 13 is developed, and thereby of the first photosensitive resin 13, an exposed portion is removed. As a result, the first photosensitive resin 13 is left in a region corresponding to the convexity 8b of the concavity and convexity pattern 8g.

After thus developed, the first photosensitive resin 13 is heated, and thereby the first photosensitive resin is melted. As a result, as shown in FIG. 9J, the first photosensitive resin 13 becomes a photosensitive resin layer 13a that swells upward with roundness. The concavity and convexity formation layer 13a is left also in the formation region of the TFT 30. Accordingly, in the concavity and convexity formation layer 13a, a contact hole for electrically connecting the pixel electrode 9a and the drain electrode 6b is formed.

Next, as shown in FIG. 10K, a top layer insulating film 7a made of a second photosensitive resin is formed. At this time, in the top layer insulating film 7a, a contact hole for electrically connecting the pixel electrode 9a and the drain electrode 6b is formed.

In the next place, as shown in FIG. 10L, on a surface of the top layer insulating film 7a, a metal film 8 of a metal such as aluminum is formed. Thereafter, on a surface thereof, by use of photolithography, a resist mask 556 is formed, through the resist mask 556 the metal film 8 is patterned, and as shown in FIG. 10M, a light reflection film 8a is formed. At this time, in a region that overlaps with part of the convexities of many convexities where the concavity and convexity formation layer 13a is left, a light transmission window 8d is formed. In the light reflection film 8a thus formed, a surface shape of the concavity and convexity formation layer 13a on a bottom layer side is reflected through the top layer insulating film 7a. Accordingly, on a surface of the light reflection film 8a, an edgeless and smooth concavity and convexity pattern 8a is formed.

Subsequently, as shown in FIG. 11N, an ITO film 9 having a thickness of 40 to 200 nm is formed on a front surface side of the light reflection film 8a by use of the sputtering method. Thereafter, by use of the photolithography, a resist mask 557 is formed, through the resist mask 557 the ITO film 9 is etched, and thereby, as shown in FIG. 11O, a pixel electrode 9a is formed.

Thereafter, as shown in FIG. 5, a polyimide film (orientation film 12) is formed on a front surface side of the pixel electrode 9a. For this, polyimide varnish in which 5 to 10% by weight of polyimide or polyamide aid is dissolved in a solvent, such as butyl cellosolve or n-methyl pyrrolidone, is flexographically printed followed by heating and curing (baking). Thereafter, a substrate thereon the polyimide film is formed is rubbed in a definite direction with a buffing cloth made of Rayon fiber, and thereby polyimide molecules are oriented in a definite direction in the neighborhood of a surface. As a result, owing to an interaction between later filled liquid crystal molecules and polyimide molecules, the liquid crystal molecules are oriented in a definite direction.

Figure 12:
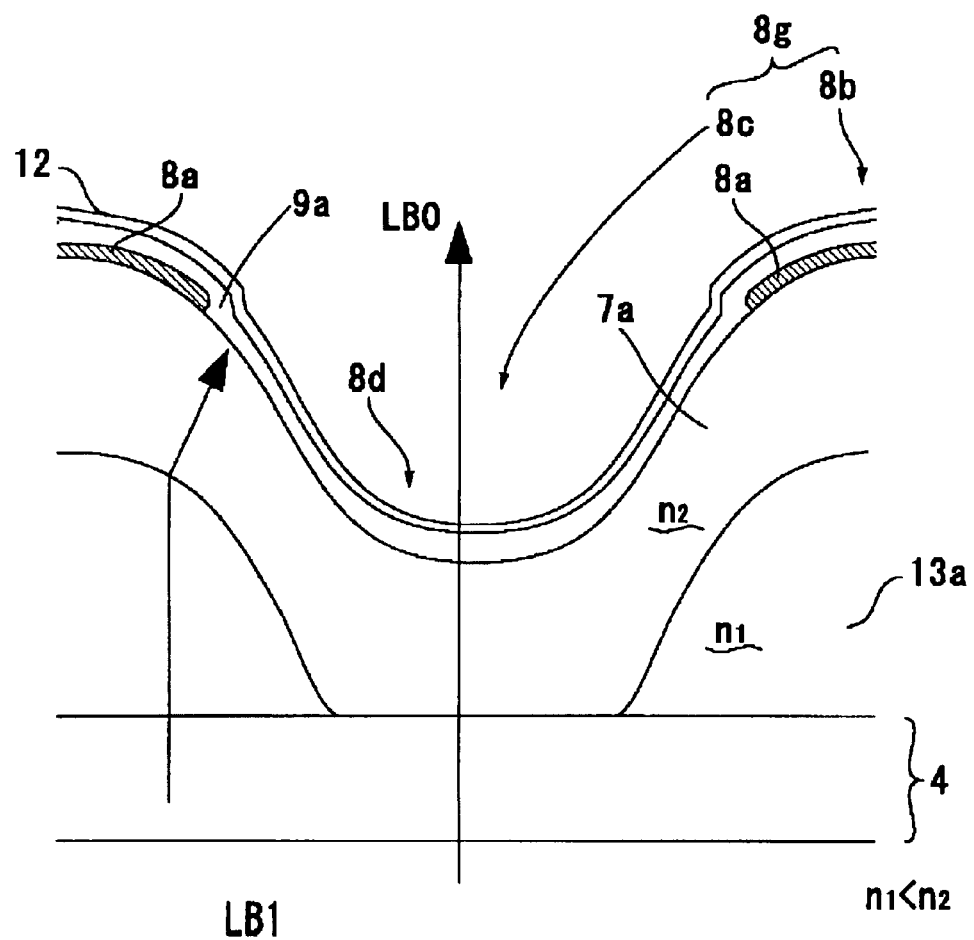
FIG. 12 is an explanatory drawing of a concavity and convexity pattern and a light transmission window of the TFT array substrate, in another electro-optic device thereto the present invention is applied.

In the above mode, the light transmission windows 8d are formed at positions that overlap with the convexities 8b of the concavity and convexity pattern 8g, the concavity and convexity formation layer 13a is formed of the first photosensitive resin having a refractive index, $n_1$, and on a top layer of the concavity and convexity formation layer 13a the top layer insulating film 7a made of the second photosensitive resin having a refractive index, $n_2$ ($n_1 > n_2$), is formed. However, as shown in FIG. 12, the light transmission windows 8d are formed at positions that overlap with the concavities 8c of the concavity and convexity pattern 8g, the concavity and convexity formation layer 13a is formed of the first photosensitive resin having a refractive index, $n_1$, and on a top layer of the concavity and convexity formation layer 13a the top layer insulating film 7a made of the second photosensitive resin having a refractive index, $n_2$ ($n_1 < n_2$), may be formed.

Also in the case thus configured, an interface between the concavity and convexity formation layer 13a and the top layer insulating film 7a plays a lens function by which a light incident from a back surface side of the TFT array substrate 10 is refracted toward the light transmission window 8d. Accordingly, of the light entering from the back surface side of the TFT array substrate 10, a light that proceeds toward the light reflection film 8a and does not formerly contribute in the display in the transmission mode passes through the light transmission window 8d and contributes in the display as shown with an arrow mark LB1 in FIG. 12. Accordingly, since, without increasing an area of the light transmission window 8d, a display light amount in the transmission mode can be increased, without sacrificing the display brightness in the reflection mode, the display brightness in the transmission mode can be improved. Since other configuration is common with the above embodiment, portions having common functions are shown in FIG. 12 with the same reference numerals, and explanation thereof will be omitted.

Furthermore, in the embodiment, an example in which a TFT is used as a pixel switching active element is explained. However, a case where as the active element a thin film diode element (TFD element/Thin Film Diode element) such as a MIM (Metal Insulator Metal) element is used is the same.

The translucent reflection type electro-optic device 100 configured like this can be used as display portions of various electronic instruments. An example thereof will be explained with reference to FIGS. 13 through 15.

Figure 13:
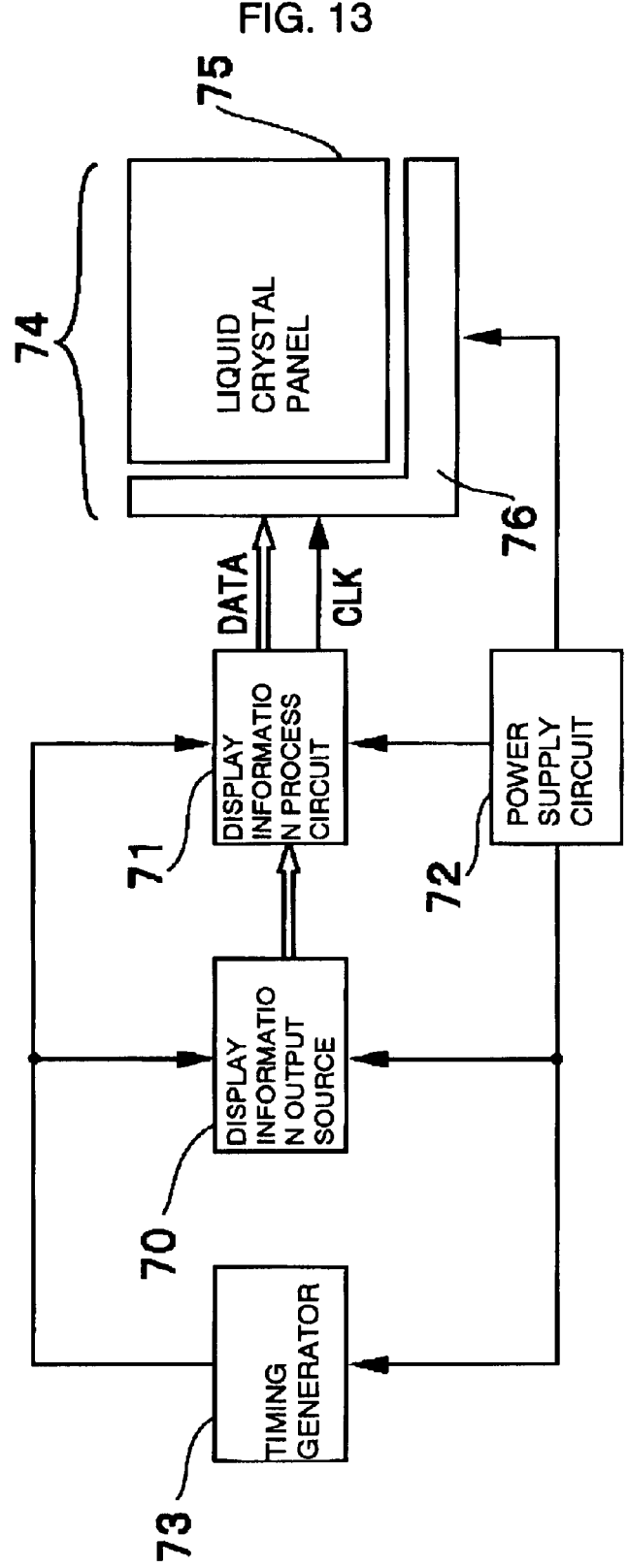
FIG. 13 is a block diagram showing a circuit configuration of an electronic instrument in which an electro-optic device according to the present invention is used as a display device.

FIG. 13 is a block diagram showing a circuit configuration of an electronic instrument in which the electro-optic device according to the present invention is used as a display device.

In FIG. 13, the electronic instrument includes a display information output source 70, a display information process circuit 71, a power supply circuit 72, a timing generator 73 and a liquid crystal display 74. Furthermore, the liquid crystal display 74 includes a liquid crystal display panel 75 and a driving circuit 76. As the liquid crystal display device 74, the above electro-optic device 100 can be used.

The display information output source 70 includes a memory, such as a ROM (Read Only Memory) and a RAM (Random Access Memory), a storage unit such as various kinds of discs, and a synchronizing circuit for outputting a digital image signal in a synchronized manner, and based on various clock signals generated by the timing generator 73 display information such as image signals processed according to a predetermined format is supplied to the display information process circuit 71.

The display information process circuit 71 includes a serial-parallel conversion circuit and various kinds of known circuits such as amplifier/inverter, a rotation circuit, a gamma correction circuit, and a clamp circuit, processes inputted display information, and supplies the image signal together with the clock signal CLK to the driving circuit 76. The power supply circuit 72 supplies a predetermined voltage to each of various constituent elements.

Figure 14:
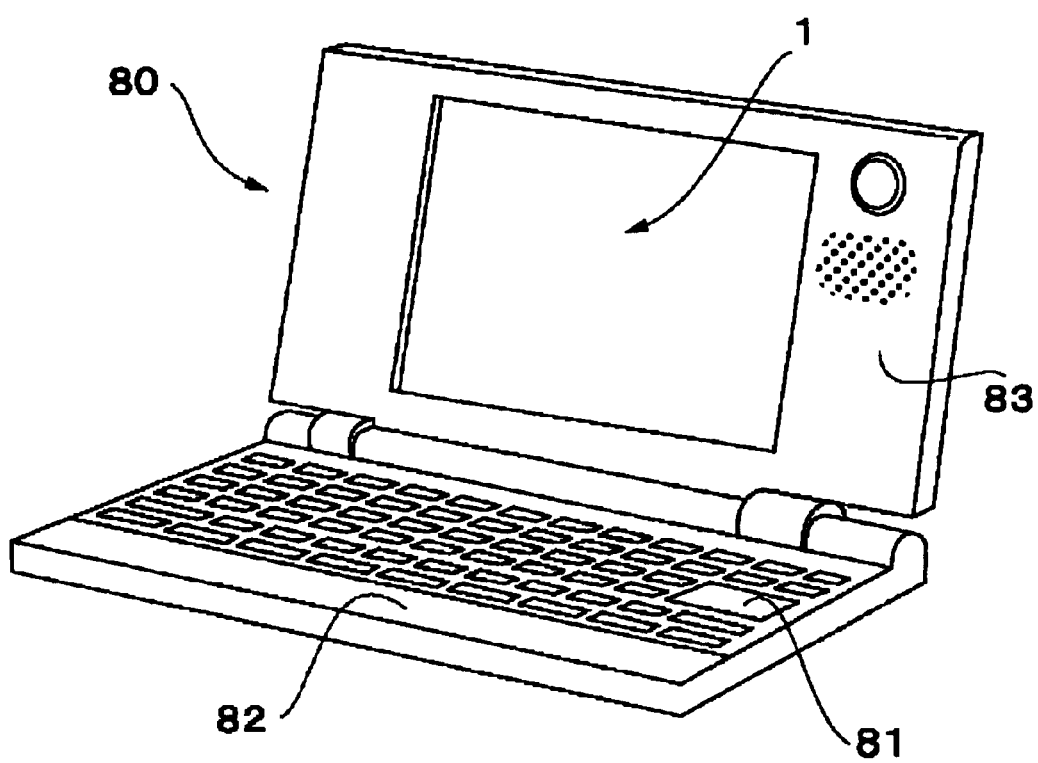
FIG. 14 is an explanatory diagram showing a mobile type personal computer in which the electro-optic device according to the present invention is used.

FIG. 14 shows a mobile type personal computer that is one embodiment of an electronic instrument according to the present invention. A personal computer 80 shown here includes a body 82 provided with a keyboard 81 and a liquid crystal display unit 83. The liquid crystal display unit 83 is configured including the above electro-optic device 100.

Figure 15:
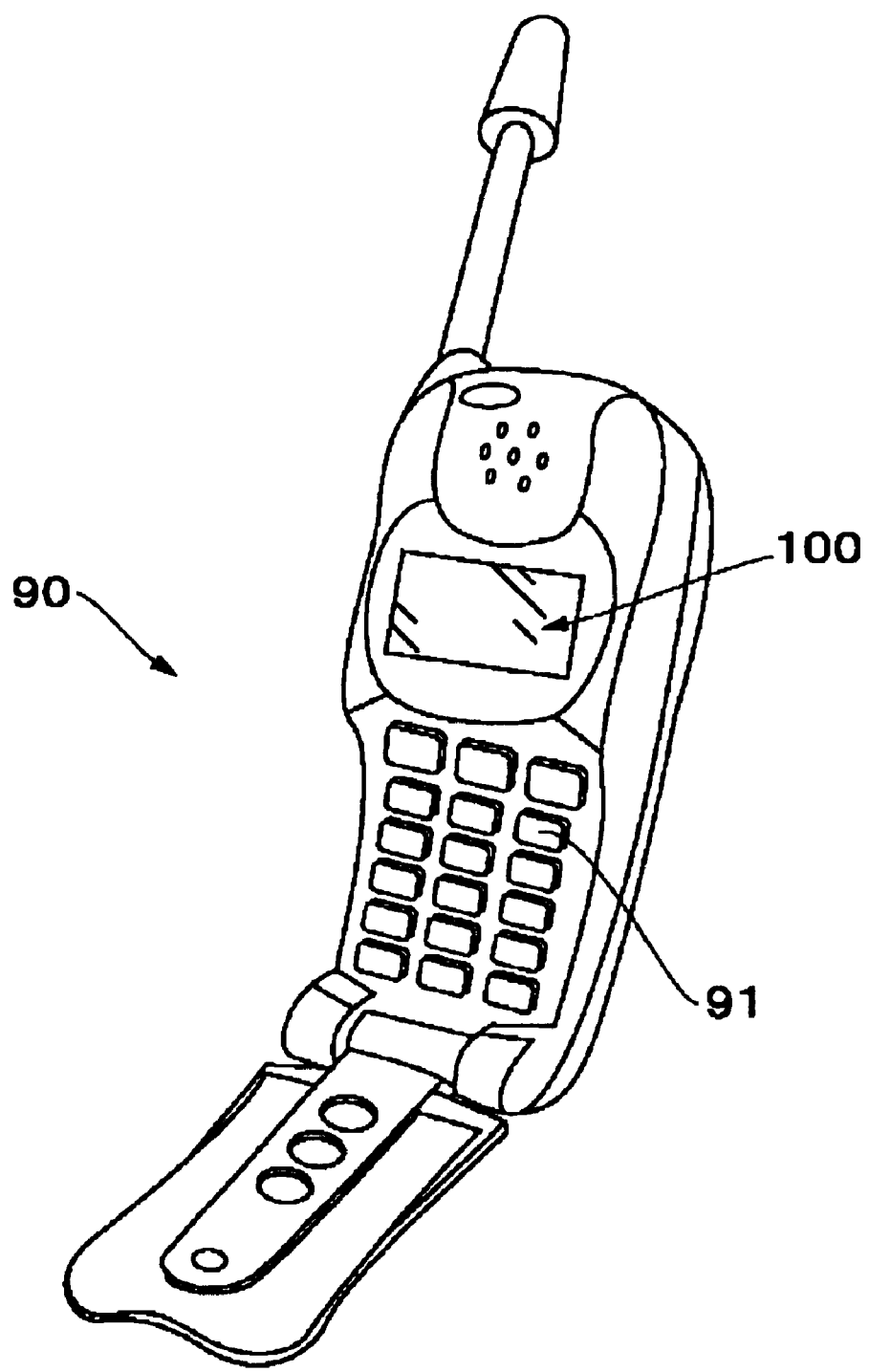
FIG. 15 is an explanatory diagram of a portable telephone in which the electro-optic device according to the present invention is used.
Figure 16:
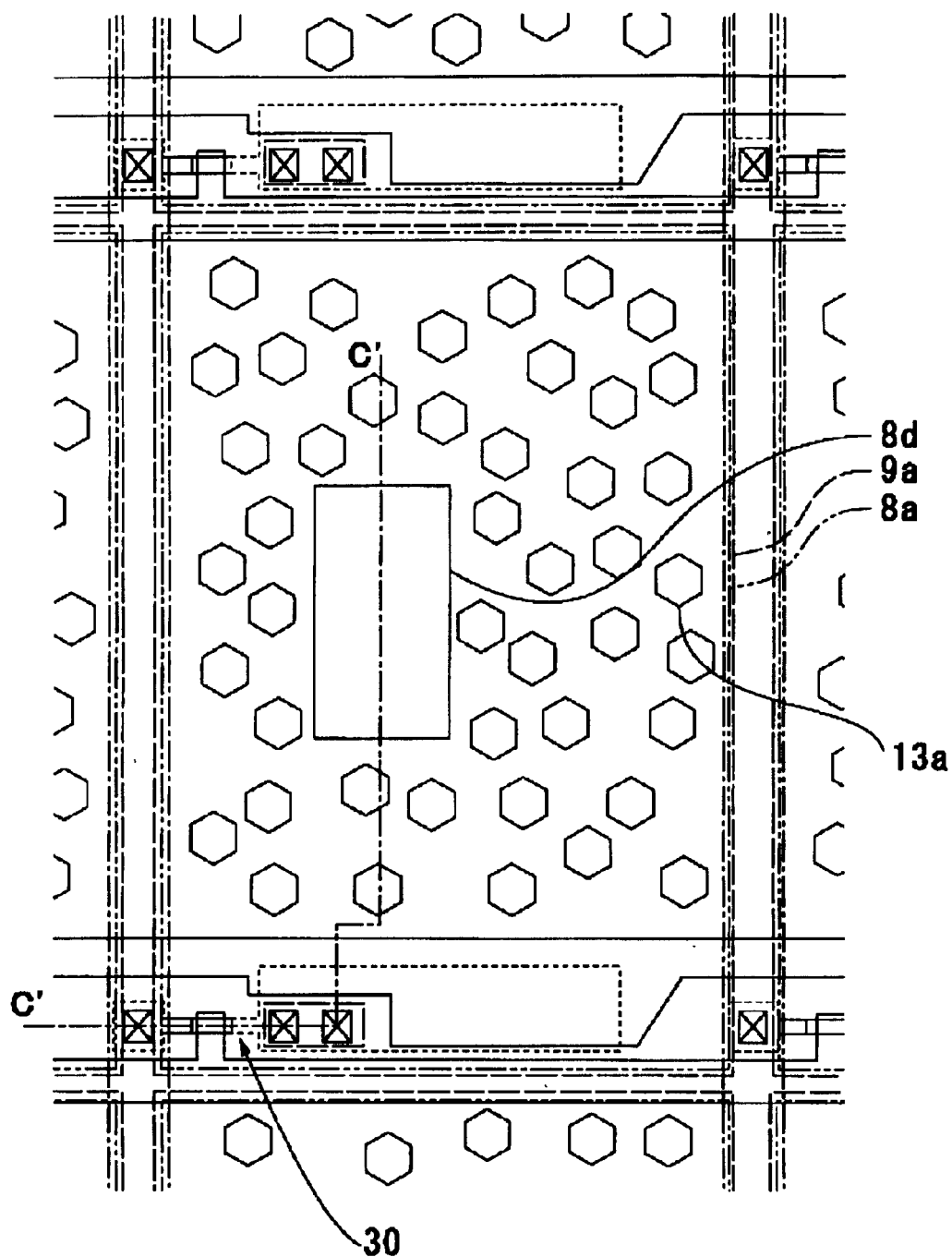
FIG. 16 is a plan view showing a configuration of an individual pixel formed on a TFT array substrate of an existing electro-optic device.
Figure 17:
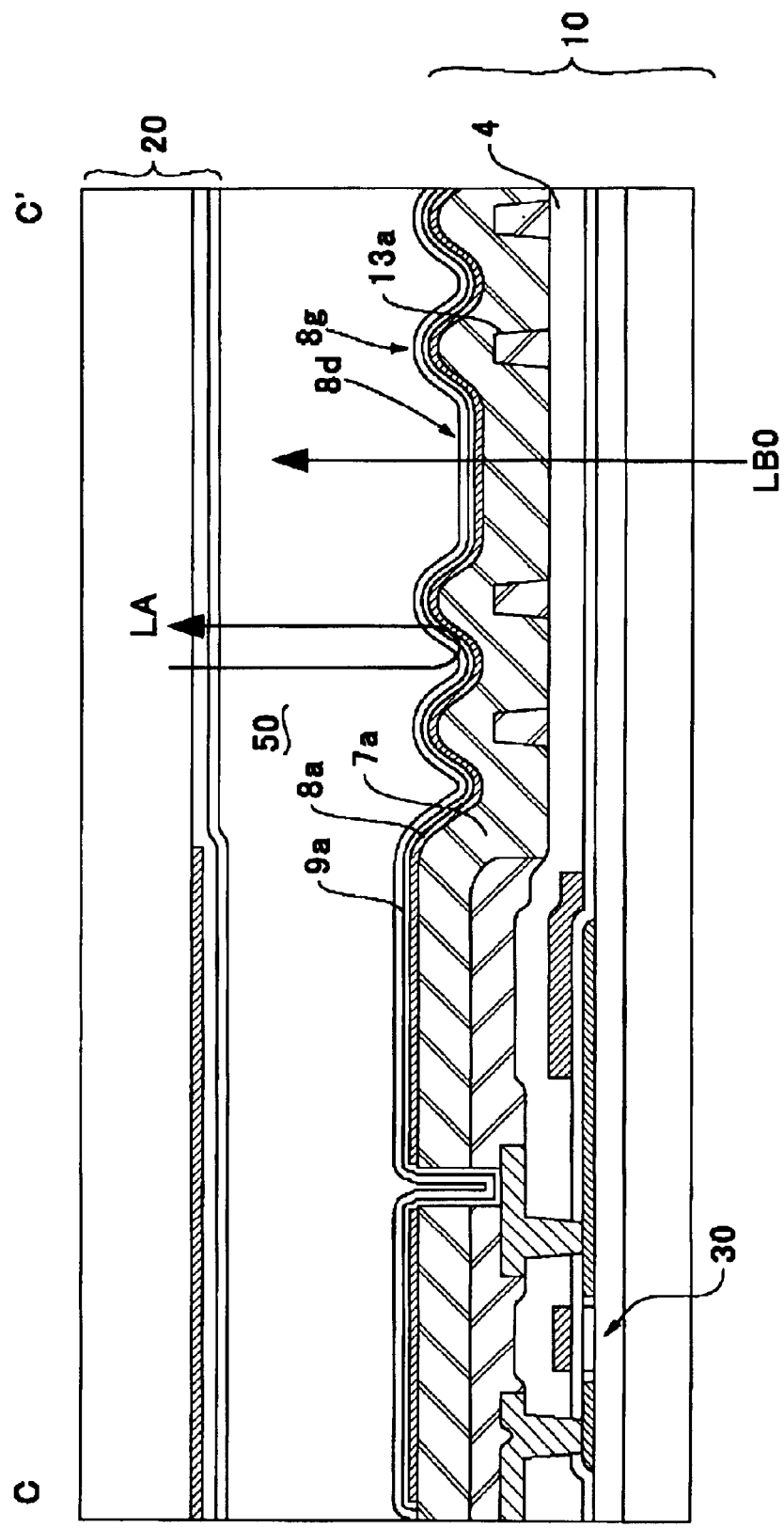
FIG. 17 is a sectional view of the existing electro-optic device.
Figure 18:
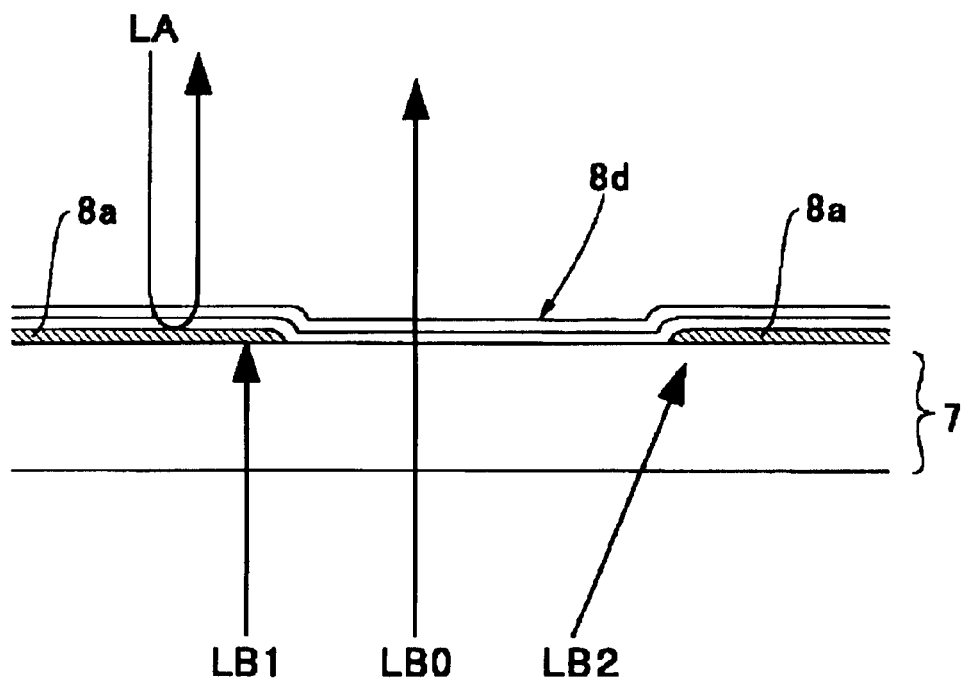
FIG. 18 is an explanatory diagram of a concavity and convexity pattern and a light transmission window formed on a TFT array substrate of the existing electro-optic device.

FIG. 15 shows a portable telephone that is another embodiment of the electronic instrument according to the present invention. A portable telephone 90 shown here includes a plurality of operational buttons 91 and a display portion constituted of the above electro-optic device 100.

As explained above, in the present invention, owing to the formation of the light reflection film, the display in the reflection mode can be performed, and at the same time, owing to the partial formation of the light transmission window in the light reflection film, the display in the transmission mode can be performed. Here, as the first light transmitting material that forms the concavity and convexity formation layer on the bottom layer side of the light reflection film and the second light transmitting material that forms the top layer insulating film, ones of different refractive indices are used, and on positions each of which overlaps with the convexities or concavities that constitute the concavity and convexity formation layer the light transmission windows are formed, and thereby at an interface between the concavity and convexity formation layer and the top layer insulating film, a passage of an incident light is deflected owing to refraction. Accordingly, by arbitrarily selecting the refractive indices of the first light transmitting material and the second light transmitting material, the interface between the concavity and convexity formation layer and the top layer insulating film can be endowed with a lens function. Accordingly, of a light entered from a back surface side of the substrate, a light that proceeds toward the light reflection film and does not formerly contribute in the display in the transmission mode can partially go through the light transmission window and can contribute in the display. Accordingly, without expanding an area of the light transmission window, a display light amount in the transmission mode can be increased. As a result, without sacrificing the display brightness in the reflection mode, the display brightness in the transmission mode can be improved.

What is claimed is:

1. A translucent reflection type electro-optic device that includes, on a substrate that holds an electro-optic material:
   a concavity and convexity formation layer made of a first light transmitting material formed in a predetermined pattern;
   a top layer insulating film made of a second light transmitting material formed on a top layer side of the concavity and convexity formation layer;
   a light reflection film formed on a top layer side of the top layer insulating film;
   a light transmitting electrode formed on a top layer or a bottom layer of the light reflection film at a top layer side of the top layer insulating film;
   a light transmission window that is partially formed in the light reflection film, the light transmission window being plurally formed at positions each of which overlaps with at least part of a plurality of convexities that the concavity and convexity formation layer forms, or with at least part of a plurality of concavities; and
   each of the first light transmitting material and the second light transmitting material having a refractive index that endows an interface between the concavity and convexity formation layer and the top layer insulating film with a lens function that refracts a light entered from a back surface side of the substrate toward the light transmission window.

2. The translucent reflection type electro-optic device as set forth in claim 1, the light transmission window being formed at least at a position that overlaps with part of the plurality of convexities, and the convexity has a convex lens shape that swells upward with roundness; and
   the first light transmitting material having a refractive index larger than that of the second light transmitting material.

3. The translucent reflection type electro-optic device as set forth in claim 1, the light transmission window being formed at least at a position that overlaps with part of the plurality of concavities, and the concavity has a concave lens shape that dents downward with roundness, and the first light transmitting material having a refractive index smaller than that of the second light transmitting material.

4. The translucent reflection type electro-optic device as set forth in claim 1, both the first light transmitting material and the second light transmitting material being a light transmitting photosensitive resin.

5. The translucent reflection type electro-optic device as set forth in claim 1, the light transmitting electrode being formed on a top layer of the light reflection film.

6. The translucent reflection type electro-optic device as set forth in claim 1, the electro-optic material being a liquid crystal.

7. An electronic instrument including the translucent reflection type electro-optic device provided in claim 1.

8. A method of fabricating a translucent reflection type electro-optic device that includes, on a substrate that holds an electro-optic material:
   forming a concavity and convexity formation layer made of a first light transmitting material in a predetermined pattern;
   forming a top layer insulating film made of a second light transmitting material on a top layer side of the concavity and convexity formation layer;
   forming a light reflection film on a top layer side of the top layer insulating film;
   forming a light transmitting electrode on a top layer or a bottom layer of the light reflection film at a top layer side of the top layer insulating film;
   forming a light transmission window that is partially in the light reflection film;
   plurally forming the light transmission window at positions each of which overlaps with at least part of a plurality of convexities that the concavity and convexity formation layer forms, or with at least part of a plurality of concavities; and
   using, as the first light transmitting material and the second light transmitting material, transparent materials having different refractive indices, and thereby endowing an interface between the concavity and convexity formation layer and the top layer insulating film with a lens function that refracts a light entered from a back surface side of the substrate toward the light transmission window.

9. The method of fabricating a translucent reflection type electro-optic device as set forth in claim 8, the plurality of convexities being formed into a convex lens shape that swells upward with roundness, and as the first light transmitting material a light transmitting material having a refractive index larger than that of the second light transmitting material is used, and in the light reflection film the light transmission window being formed at a position that overlaps with at least part of the plurality of convexities.

10. The method of fabricating a translucent reflection type electro-optic device as set forth in claim 9, when the plurality of convexities is formed into a convex lens shape that swells upward with roundness, after the concavity and convexity formation layer is formed into a predetermined pattern with a transparent photosensitive resin as the first light transmitting material, the photosensitive resin being heated and melted.

11. The method of fabricating a translucent reflection type electro-optic device as set forth in claim 8, the plurality of concavities being formed into a concave lens shape that dents downward with roundness, and, as the first light transmitting material, a light transmitting material having a refractive index smaller than that of the second light transmitting material is used and in the light reflection film, the light transmission window being formed at a position that overlaps with at least part of the plurality of concavities.

12. The method of fabricating a translucent reflection type electro-optic device as set forth in claim 11, when the plurality of concavities is formed into a concave lens shape that dents downward with roundness, after the concavity and convexity formation layer is formed into a predetermined pattern with a transparent photosensitive resin as the first light transmitting material, the photosensitive resin being heated and melted.

13. The method of fabricating a translucent reflection type electro-optic device as set forth in claim 8 as the second light transmitting material, a photosensitive resin used.

14. The method of fabricating a translucent reflection type electro-optic device as set forth in claim 8, the light transmitting electrode being formed on a top layer of the light reflection film.

15. A translucent reflection type electro-optic device that includes, on a substrate that holds an electro-optic material:
a concavity and convexity formation layer made of a first light transmitting material formed in a predetermined pattern;
a top layer insulating film made of a second light transmitting material formed on a top layer side of the concavity and convexity formation layer;
a light reflection film formed on a top layer side of the top layer insulating film;
a light transmitting electrode formed on a top layer or a bottom layer of the light reflection film at a top layer side of the top layer insulating film;
a light transmission window is partially formed in the light reflection film, wherein the light transmission window being plurally formed at positions each of which overlaps with at least part of a plurality of convexities that the concavity and convexity formation layer forms, or with at least part of a plurality of concavities; and
each of the first light transmitting material and the second light transmitting material having a refractive index different from each other.

* * * * *